(12) United States Patent
Patterson

(10) Patent No.: US 7,874,955 B2
(45) Date of Patent: Jan. 25, 2011

(54) BICYCLE TRANSMISSION SYSTEM

(75) Inventor: Sam Harwell Patterson, Fort Lauderdale, FL (US)

(73) Assignee: Patterson Bicycle Transmission, LLC, DeLeon Springs, FL (US)

(*) Notice: Subject to any disclaimer, the term of this patent is extended or adjusted under 35 U.S.C. 154(b) by 517 days.

(21) Appl. No.: 11/983,311

(22) Filed: Nov. 8, 2007

(65) Prior Publication Data
US 2009/0088284 A1 Apr. 2, 2009

Related U.S. Application Data

(60) Provisional application No. 60/995,632, filed on Sep. 28, 2007.

(51) Int. Cl.
*F16H 3/74* (2006.01)
*F16H 3/44* (2006.01)

(52) U.S. Cl. .................. 475/259; 475/312; 475/270

(58) Field of Classification Search ............ 475/16, 475/270, 293, 311–313, 296; 192/43.1, 45.1
See application file for complete search history.

(56) References Cited

U.S. PATENT DOCUMENTS

| | | | |
|---|---|---|---|
| 1,395,067 A | 10/1921 | Warren | |
| 2,189,220 A | 2/1940 | Osborne | |
| 2,409,132 A * | 10/1946 | Lear | 244/110 G |
| 2,424,821 A * | 7/1947 | Harrer | 100/4 |
| 2,649,281 A * | 8/1953 | Hastings, Jr. | 254/344 |
| 3,505,912 A * | 4/1970 | Miller | 475/8 |
| 3,893,206 A * | 7/1975 | Pickles et al. | 16/325 |
| 4,273,008 A * | 6/1981 | Ishihara et al. | 475/13 |
| 4,303,255 A | 12/1981 | Thomas | |
| 4,369,674 A * | 1/1983 | Hamane et al. | 475/258 |
| 4,400,999 A * | 8/1983 | Steuer | 475/213 |
| 4,610,644 A | 9/1986 | Nagano | |

(Continued)

FOREIGN PATENT DOCUMENTS

EP 0159855 7/1989

(Continued)

OTHER PUBLICATIONS

International Searching Authority, International Search Report and Written Opinion, International Application No. PCT/08/07769, Dec. 1, 2008.

*Primary Examiner*—Tisha D Lewis
(74) *Attorney, Agent, or Firm*—Clause Eight IPS; Michael Catania

(57) ABSTRACT

An enclosed bicycle drivetrain is provided that produces a range of drive ratios suitable for any riding purpose. The enclosure of substantially the entire drivetrain is made practical by the synergistic cooperation of a planetary drive system using a single chain ring and a streamlined rear derailleur system that separates the tensioning and chain guiding functions of a conventional rear derailleur, allowing the rear derailleur components to remain substantially within the shadow of the outer perimeter of the bicycle frame. The planetary drive system is provided with a unique compound pawl that may be easily disengaged from a planetary ratchet member under full riding loads by the application of a small force to destabilize the pawl. A unique shift buffer mechanism cooperates with the rear derailleur system to buffer and store up to the full range of available shift commands.

4 Claims, 23 Drawing Sheets

U.S. PATENT DOCUMENTS

| | | | |
|---|---|---|---|
| 4,732,054 A * | 3/1988 | Takamiya et al. | 475/166 |
| 4,854,191 A | 8/1989 | Nagano | |
| 5,177,523 A * | 1/1993 | Huang et al. | 396/132 |
| 5,273,500 A | 12/1993 | Nagano | |
| 5,303,942 A | 4/1994 | Schlumpf | |
| 5,358,192 A * | 10/1994 | Doty | 242/384.5 |
| 5,445,567 A | 8/1995 | Chattin | |
| 5,496,049 A | 3/1996 | Escobedo | |
| 5,609,071 A | 3/1997 | Schlumpf | |
| 5,620,384 A | 4/1997 | Kojima | |
| 5,887,318 A | 3/1999 | Nicoletti | |
| 5,895,336 A * | 4/1999 | Yoo | 475/318 |
| 5,961,409 A | 10/1999 | Ando | |
| 6,029,990 A | 2/2000 | Busby | |
| 6,079,726 A | 6/2000 | Busby | |
| 6,123,639 A | 9/2000 | Schlumpf | |
| 6,155,585 A | 12/2000 | Busby | |
| 6,173,982 B1 | 1/2001 | Westergard | |
| 6,267,704 B1 | 7/2001 | Patterson | |
| 6,325,739 B1 | 12/2001 | Hino | |
| 6,361,461 B1 | 3/2002 | Pusic | |
| 6,478,710 B1 | 11/2002 | Steuer et al. | |
| 6,533,700 B2 | 3/2003 | Shoge | |
| 6,540,244 B1 | 4/2003 | Oda | |
| 6,558,288 B2 | 5/2003 | Okochi | |
| 6,572,508 B2 | 6/2003 | Shoge | |
| 6,607,465 B1 | 8/2003 | Shoge | |
| 6,641,500 B2 | 11/2003 | Shoge | |
| 6,692,400 B2 | 2/2004 | Butz | |
| 6,764,423 B2 | 7/2004 | Lemanski | |
| 6,875,150 B2 | 4/2005 | Matsuo et al. | |
| 6,988,973 B2 | 1/2006 | Steuer | |
| 7,083,542 B2 | 8/2006 | Itou et al. | |
| 7,166,054 B2 | 1/2007 | Urabe | |
| 7,192,379 B2 | 3/2007 | Steuer et al. | |
| 7,712,566 B2 | 5/2010 | Jordan et al. | |
| 2003/0186776 A1 | 10/2003 | Wu | |
| 2004/0171454 A1 | 9/2004 | Itou et al. | |
| 2004/0200307 A1 | 10/2004 | Mitchell | |
| 2007/0275811 A1 * | 11/2007 | Starik | 475/259 |
| 2009/0260476 A1 | 10/2009 | Jordan et al. | |

FOREIGN PATENT DOCUMENTS

| | | |
|---|---|---|
| EP | 0922630 | 6/2004 |
| EP | 1980484 | 10/2008 |
| EP | 2112062 | 10/2009 |
| WO | WO9946159 | 9/1999 |

* cited by examiner

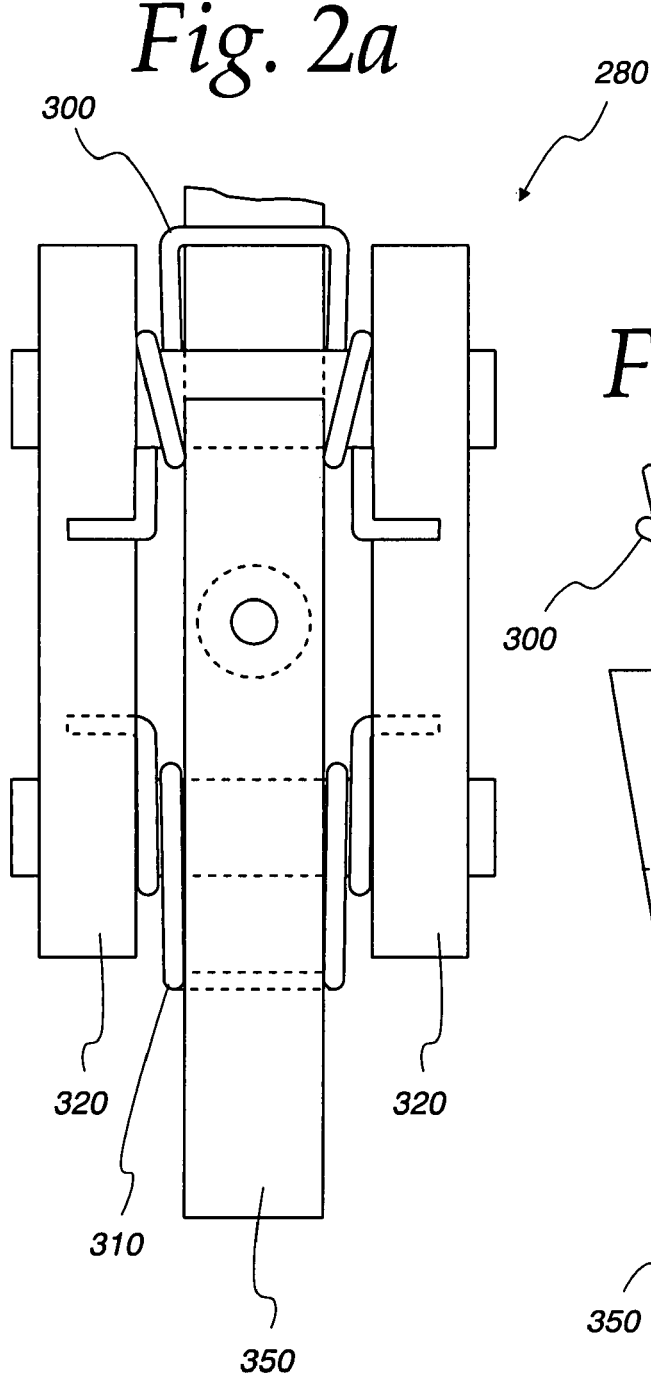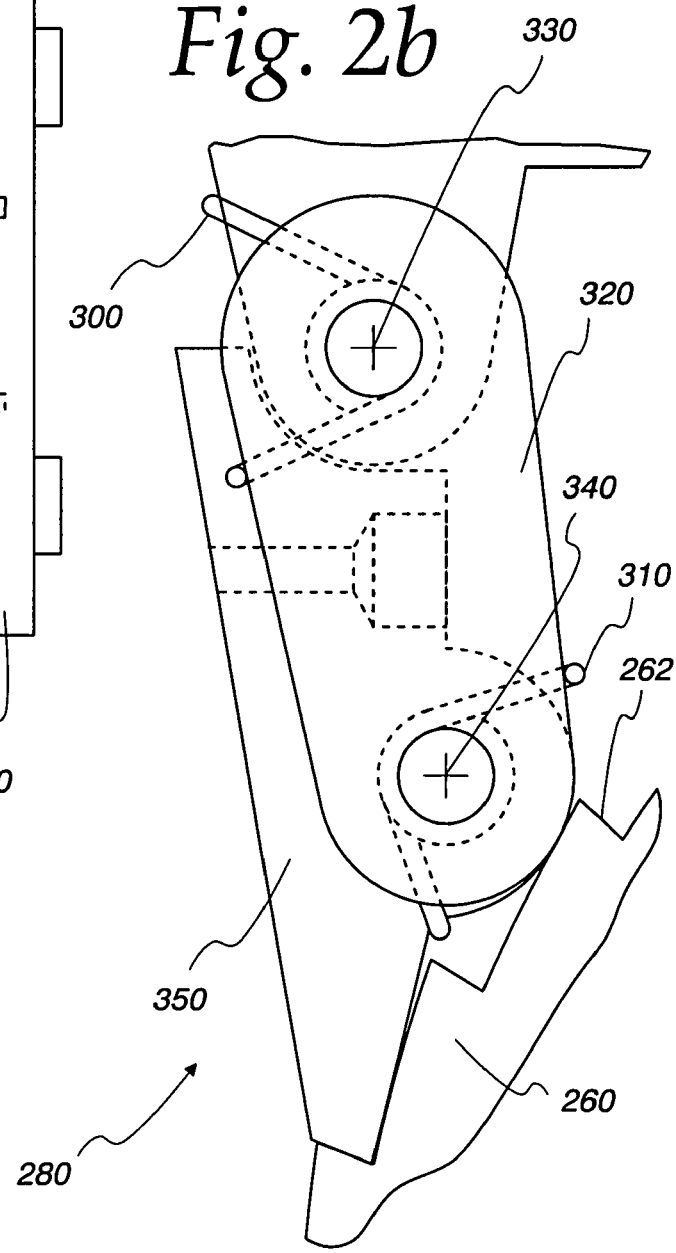

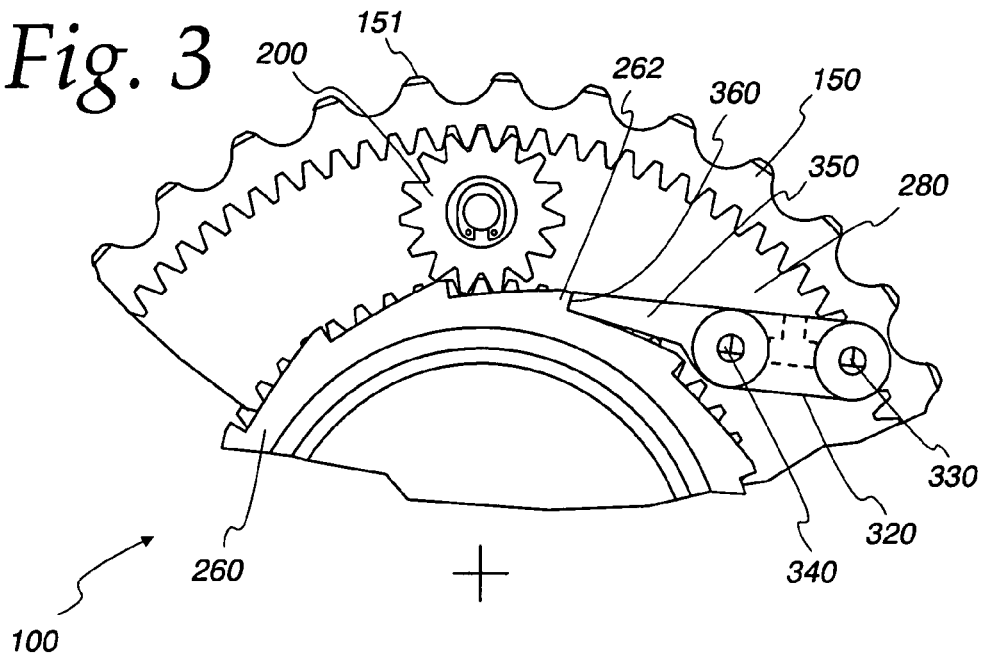
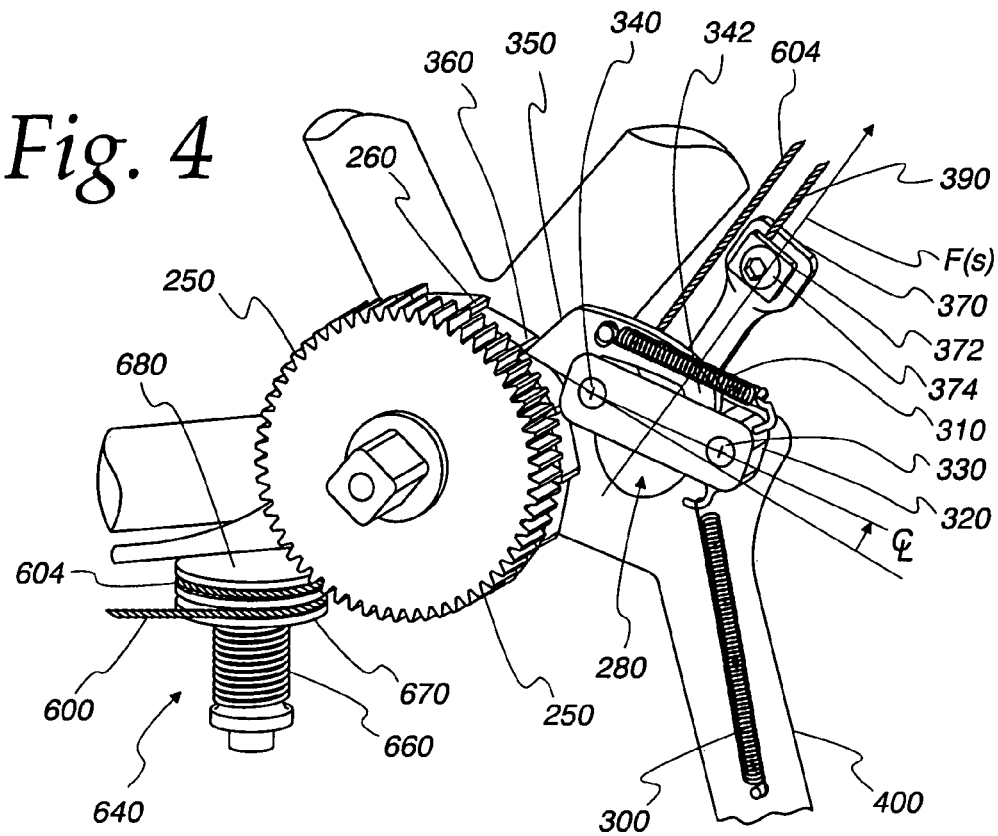

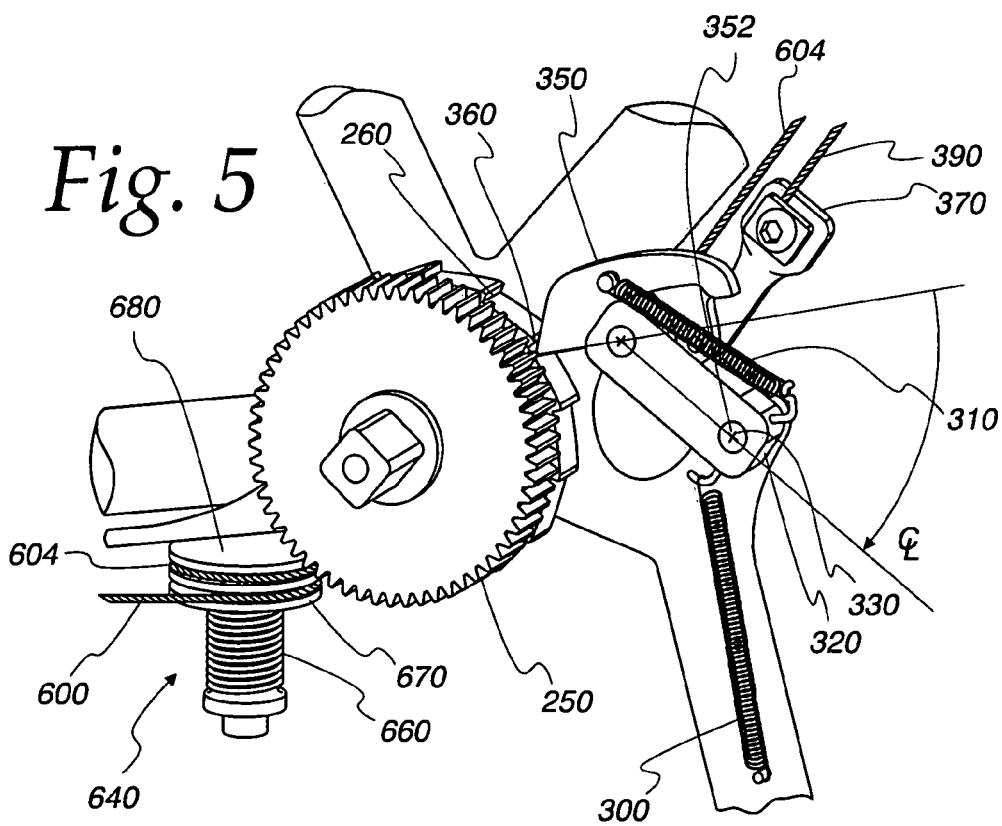
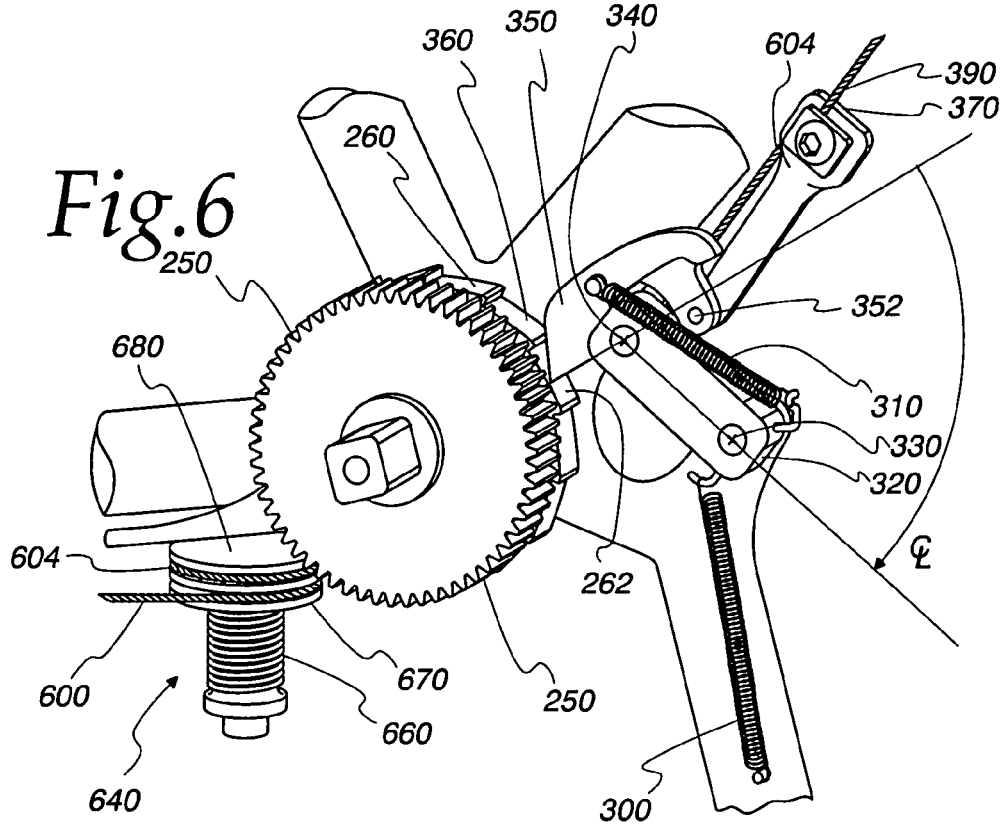

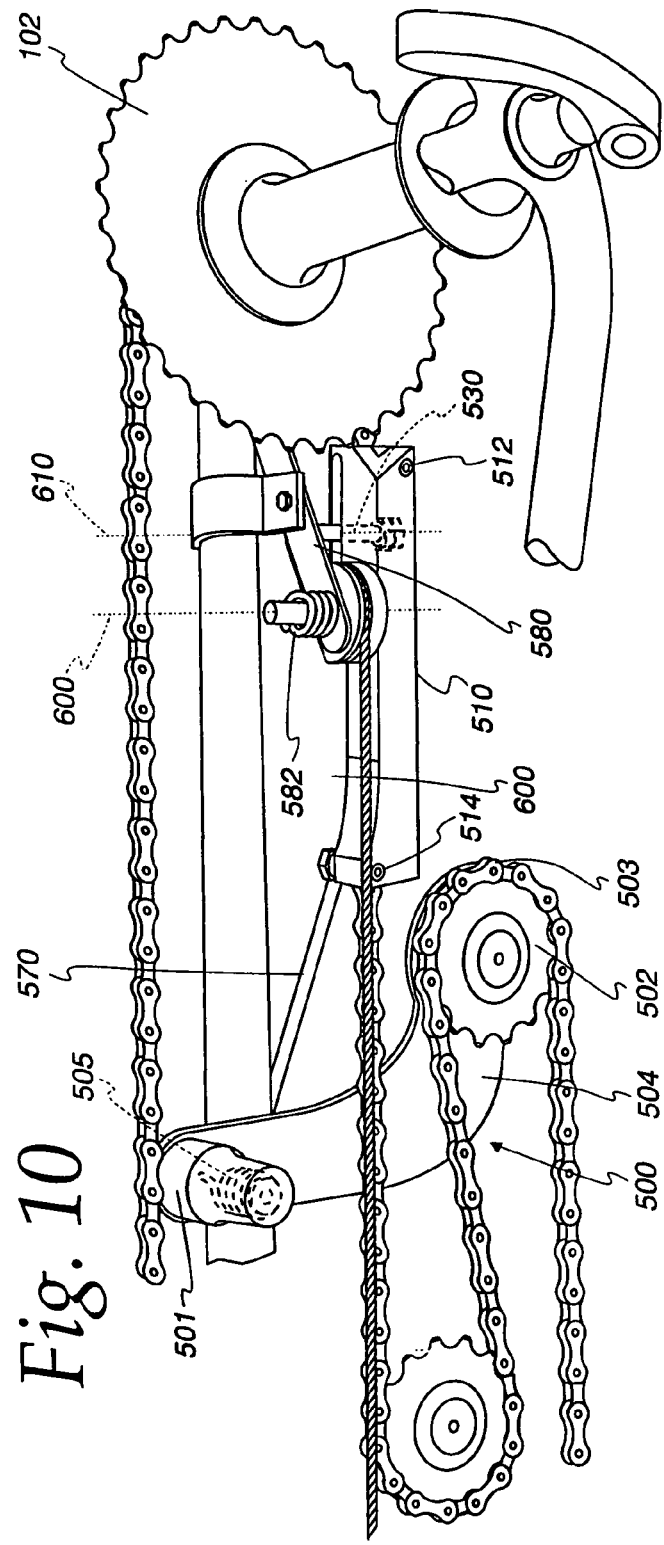
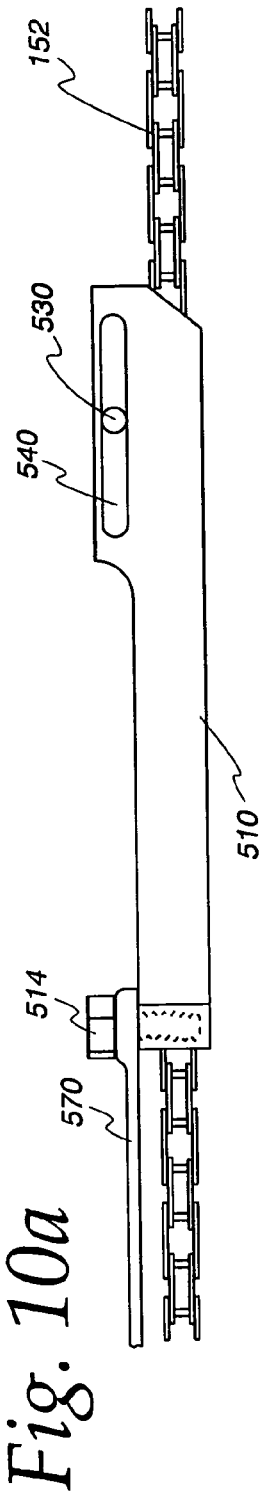
Fig. 10
Fig. 10a

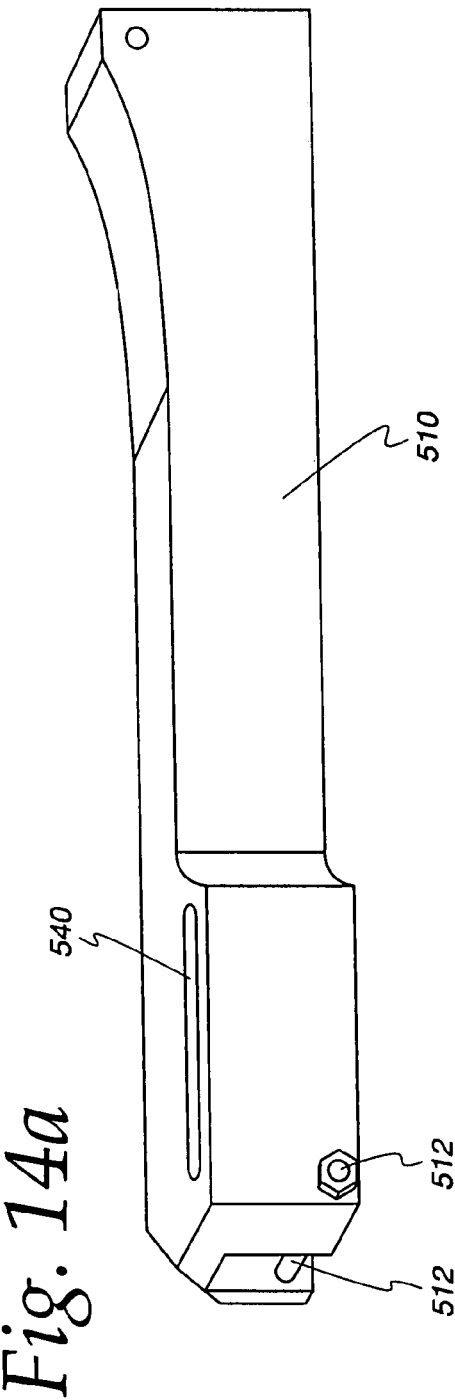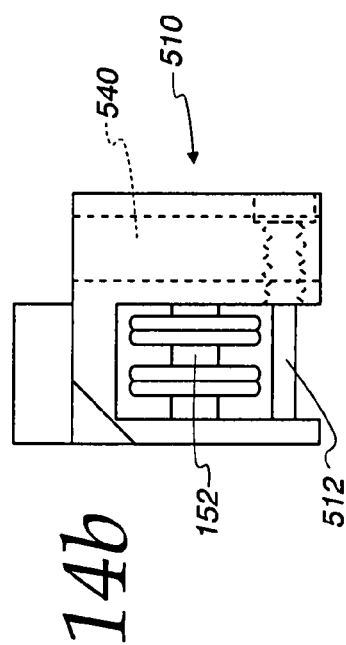

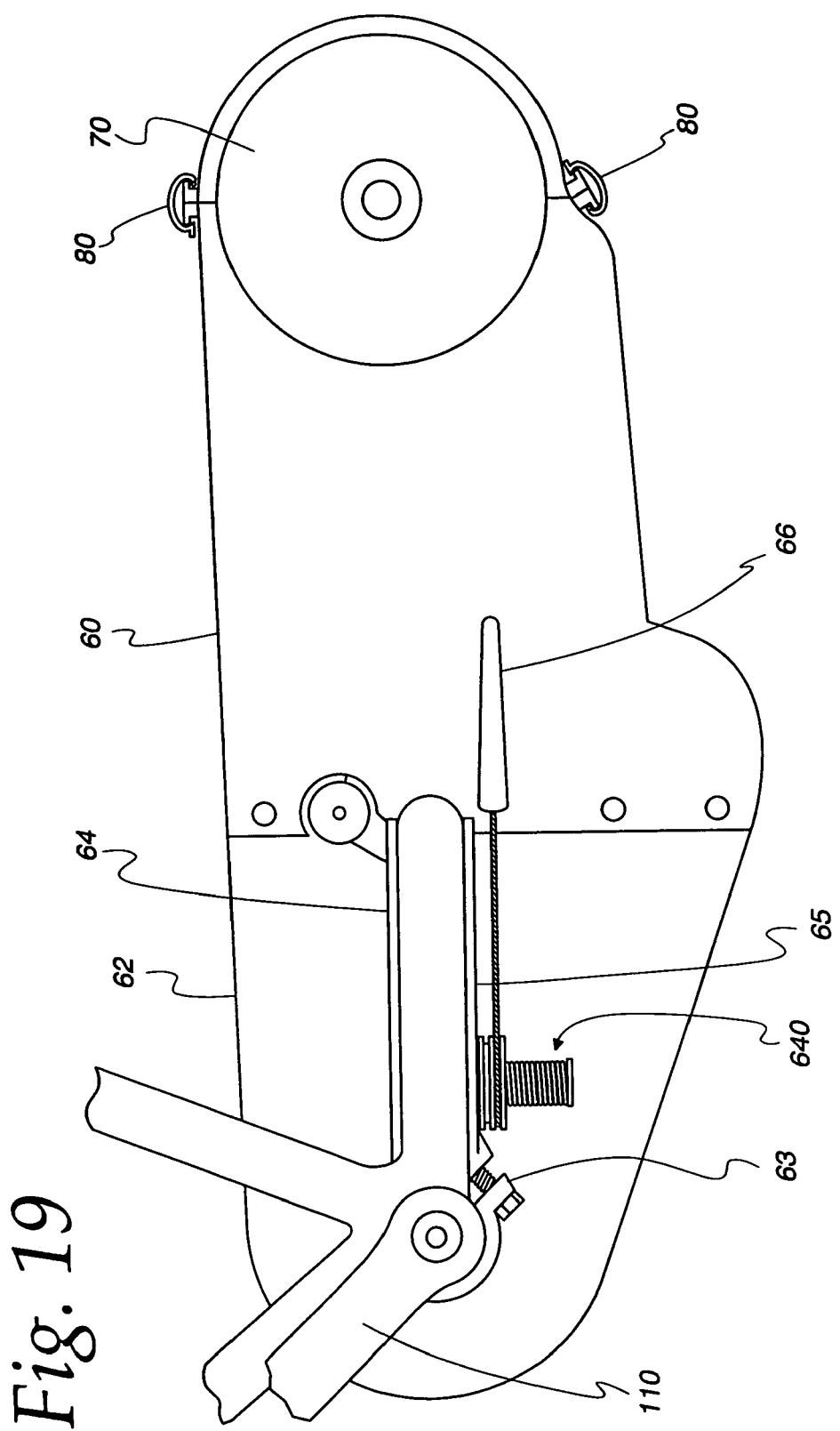

BICYCLE TRANSMISSION SYSTEM

CROSS REFERENCE TO RELATED APPLICATION

This application claims the benefit of U.S. Provisional Application No. 60/995,632, filed Sep. 28, 2007, the disclosure of which is incorporated in its entirety.

FIELD OF THE INVENTION

The present invention relates to transmission systems in human-powered, chain driven vehicles. More particularly, it relates to front planetary and rear-derailleur bicycle transmission systems. Still more particularly, it relates to an enclosed bicycle drive train including a front planetary and rear-derailleur transmission system.

BACKGROUND OF THE INVENTION

Both external (i.e., exposed) and internal (i.e., enclosed) drivetrains are common in the modern field of bicycle drivetrains. External drivetrains typically employ parallelogram-type derailleurs, a chain, and sprockets. Parallelogram-type derailleurs swing through various ranges of motion and are therefore difficult to completely enclose. The rear parallelogram-type derailleur bolts to the outside of the bicycle frame near the rear wheel hub. From this location, the parallelogram of the rear derailleur can swing even further outboard.

External drivetrains have the advantage that the number and overall range of drive ratios is not limited by the requirement that the mechanisms fit inside any wheel hub or enclosure. Typically, external drivetrains employ two or three chain rings (front sprockets) cooperating with a front derailleur. The front shifting system gives the major ranges of gearing, and a rear derailleur cooperating with rear sprockets provides the fine tuning with smaller increments of drive-ratio shifting. The rear derailleur typically controls the chain destination among seven or eight rear sprockets associated with a rear wheel. The overall drive ratio variation typically approaches 4:1.

Internal drivetrains usually take the form of an internally geared hub. The hub may be mounted near the bottom bracket using a jackshaft but is usually integral with the hub of the rear wheel. Internal gear hubs typically use planetary gearing and normally provide from three to nine speeds. Internal gear hubs have been produced with as many as twelve or fourteen speeds, but the additional weight associated with the rear wheel makes these internal gear hubs less than ideal.

The weight of a rear hub with internal gearing is acceptable for pavement riding, but undesirable for off-road riding. This has given rise to attempts to relocate it to a jackshaft near the bottom bracket, closer to the center of gravity of the bicycle. Unfortunately, the planetary gearing and jackshaft bearings reduce the efficiency of the system compared to a standard external drivetrain.

There are many tradeoffs between external and internal drivetrains. External has good gearing range and good efficiency, but is exposed to wet and mud, which can drastically reduce the efficiency and increase wear on the drivetrain. Also, the exposed drive train is vulnerable to derangement due to impact or even a small object such as a twig getting stuck in the chain, which can easily obstruct the idler pulleys, and cause the rear derailleur to break off.

Improvements to external drivetrains, such as indexed shifting and special features in chains and sprockets to promote clean and prompt shifting, have made the external drive train shiftable under load in most circumstances. The only condition under which a typical modern external drivetrain shifts poorly is when the front derailleur is shifted under load. The problem is inherent that the front derailleur is set up to shift the loaded side of the chain, in contrast to the rear derailleur, which manages the slack side of the chain, making rear shifting generally much easier.

Internal gear hubs are of course enclosed, and the mechanisms live in an oil or grease bath substantially free of contamination.

Internal gear hubs change ratios without the need to alter the chain path between multiple sprockets. The chain can easily be enclosed in a reasonably slim chain guard. Therefore, the shifting mechanism, sprockets, and chain are completely protected from the elements and from contaminants. This makes these bicycles very suitable for commuting in all conditions and storing outdoors.

Current Technology of Front Shifting

Bicycle drivetrains include both external and internal drivetrains. External drivetrains typically use derailleurs to transfer a drive chain from one sprocket to another to achieve various drive ratios. Internal drive trains use planetary gearing commonly situated inside the hub of the rear wheel. In recent years, planetary gears have also been located in the space of the front sprockets.

The most common form of bicycle gearing is external gearing associated with the rear hub. When it is desired to further increase the available drive ratios, external gearing associated with the front pedal crank can be added. This usually takes the form of two or three sprockets bolted to the drive side pedal crank. A front derailleur is secured to the frame. The drive chain passes through the front derailleur cage. The front derailleur places the cage in various positions to cause the drive chain to transfer to the desired chain ring to effect a shift. The front derailleur is in turn controlled by a control cable which is actuated from the handlebar. The actuator is called a "shifter" and usually takes the form of a lever or twist grip system.

The arrangement of three sprockets (also known as "chain rings") bolted to the drive side pedal crank is called a "triple chain ring." The overall drive ratio variation provided by the common "triple chain ring" is about 2:1.

Problems with the Triple Chain Ring System

Several problems are associated with the triple chain ring system. For example, it is difficult to enclose and is degraded by sand and mud when used off-road.

Another problem is that the triple chain ring system requires the front derailleur to forcibly move the taut, load-bearing part of the chain. Thus, shifting the front derailleur requires more effort and is less reliable than shifting the rear derailleur, which manages the slack part of the chain. Riders must plan ahead and shift when not applying a full load. When riders attempt to shift under load, the chain may fail to shift or derail completely off the chain rings.

The lateral spacing of the three chain rings creates oblique chain lines when riding "crossed over." This overstresses chains and causes excessive wear and friction.

Innovative bicycle designers often have to arbitrarily place a stubby vestigial seat tube on the bottom bracket to support the front derailleur. This is the case even when the frame design supports the seat with no seat tube.

Still another problem is that the front derailleur must be adjusted vertically and angularly on the seat tube in relation to the chain rings. The limit screws limiting the range of motion of the front derailleur cage must also be adjusted. Mechanics commonly use pliers to forcibly reconfigure the chain cage to a shape in which they believe it will work better.

The triple chain ring system has been evolving and in common use since the early days of mountain biking. Although it is relatively cheap and light, the triple chain ring simply does not work well under pedaling loads. Industry experts have complained of this problem for years. Unreliable front shifting is one of the industry's biggest embarrassments. This has been a barrier to expanding the bicycle market to a wider audience.

A need therefore exists for a reliable bicycle drivetrain that is suitable for harsh outdoor riding and storage conditions, while providing a sufficient range of usable gearing for any application, including but not limited to road biking and mountain biking.

BRIEF SUMMARY OF THE INVENTION

In accordance with a first aspect of the present invention, a planetary drive system is provided with a ring gear rotatably mounted to a frame; a planet gear enmeshed with the ring gear, the planet gear rotatably mounted to a planet carrier, the planet carrier rotatably mounted to the frame; a sun gear enmeshed with the planet gear, the sun gear rotatably mounted to the frame; a ratchet integral with a first planetary member selected from the group consisting of the ring gear, the planet gear, the planet carrier, the sun gear and the frame; a compound pawl movably disposed between the first planetary member and a second planetary member selected from the group consisting of the ring gear, the planet gear, the planet carrier, the sun gear and the frame, the compound pawl having a base pawl member and a blocker pawl member, the blocker pawl member adapted to engage the ratchet to prevent a driven relative rotation of the first and second planetary members, and the base pawl member movably mounted to the second planetary member at a base joint and the blocker pawl member movably positioned with respect to the base member at an articulation juncture, wherein the compound pawl stably provides blocking forces to oppose a load tending to cause the driven relative rotation when the blocker member engages the ratchet and the relative configuration of the pawl blocker and pawl base members at the articulation juncture is stable, thereby preventing the driven relative rotation; and a planetary shift actuator adapted to apply a force to the compound pawl to cause the relative configuration of the pawl blocker and pawl base members to articulate into an unstable condition at the articulation juncture, thereby substantially releasing the blocking forces and allowing the driven relative rotation.

In one embodiment of the planetary drive system of the first aspect, the planetary shift actuator comprises a planetary shift actuator linkage adapted to transmit the force to the compound pawl. The planetary shift actuator linkage is a planetary shift actuator cable retained by a cable clamp operatively connected to and pivotally mounted with respect to the base member.

In another embodiment of the planetary drive system of the first aspect, the planetary shift actuator linkage is a planetary shift actuator cable retained by a cable clamp operatively connected to and pivotally mounted with respect to the blocker pawl member.

In a second aspect of the present invention, a chain drive system is provided with a chain tensioner movably mounted to a vehicle frame, proximate to a drive sprocket; an idler sprocket rotatably mounted to the chain tensioner; a chain tensioner spring biasing the chain tensioner to move against a chain engaged to the idler sprocket thereby tensioning the chain, the chain engaged to the drive sprocket and alternately engageable to any of a plurality of axially spaced-apart driven sprockets rotatably mounted to the vehicle frame; and a chain guide associated with a portion of the chain proximate to the driven sprockets and laterally moveable with respect to the driven sprockets, wherein a lateral movement of the chain guide causes the chain to disengage one of the driven sprockets and engage an adjacent driven sprocket, thereby changing a chain drive ratio of a rotation of the engaged driven sprocket to a rotation of the drive sprocket, wherein the chain guide is substantially isolated from forces associated with tensioning the chain.

In one embodiment of the chain drive system of the second aspect, the chain guide is operatively connected to the chain tensioner so that the chain guide translates toward the driven sprockets when the chain tensioner pivots in the spring-biased direction and away from the driven sprockets when the chain tensioner pivots in the spring-opposed direction, to minimize the length of chain between the portion of chain associated with the chain guide and an engaged sprocket while maintaining clearance between the chain guide and the engaged sprocket.

In another embodiment of the chain drive system of the second aspect, the chain drive system is further provided with a derailleur actuator linkage operatively connected to the chain guide; and a derailleur actuator operatively connected to the derailleur actuator linkage, the derailleur actuator comprising a movable actuator member movably connected to a base actuator member; a detent spring disposed in compression between the movable actuator member and the base actuator member, the detent spring having a male engaging feature adapted to alternately engage any of a plurality of spaced-apart female engaging features integral with one of the base actuator member and movable actuator member, and the detent spring having opposed ends to engage end walls of a spring cavity integral with the other of the base actuator member and movable actuator member, thereby substantially preventing accidental relative movement of the movable actuator member and base actuator member when the detent spring male engaging feature is engaged to a particular female engaging feature; wherein the opposed ends are forced away from engagement with the end walls when the movable actuator member is moved with respect to the base actuator member, thereby freeing the detent spring male engaging feature to suddenly engage a female engaging feature.

In yet another embodiment of the chain drive system according to the second aspect, the chain drive system further comprises a planetary drive system associated with the drive sprocket, the planetary drive system having a ring gear integral with the drive sprocket; a planetary gear enmeshed with the ring gear, the planetary gear rotatably mounted to a spider member, the spider member rotatably mounted to the vehicle frame; a sun gear enmeshed with the planetary gear, the sun gear rotatably mounted to the vehicle frame; a ratchet integral with a first planetary member selected from the group consisting of the ring gear, the planet gear, the planet carrier, the sun gear and the frame; a pawl movably mounted to a second planetary member selected from the group consisting of the ring gear, the planet gear, the planet carrier, the sun gear and the frame; the pawl adapted to engage the ratchet to prevent a rotation of the first planetary member with respect to the second planetary member in a clockwise direction and disengage the ratchet to allow the rotation of the first planetary member with respect to the second planetary member in the clockwise direction; and a pawl actuator adapted to cause the pawl to engage and disengage the ratchet; wherein, when the pawl is engaged to the ratchet, the output rotation of an output planetary member is constrained to equal or exceed an input rotation of an input planetary member multiplied by a first planetary drive ratio, and when the pawl is disengaged from the ratchet, the output rotation of an output planetary member is constrained to equal or exceed an input rotation of an input planetary member multiplied by a second planetary drive ratio, the output and input planetary members selected from the group consisting of the ring gear, the planet gear, the planet carrier, the sun gear and the frame.

In a third aspect of the present invention, an in-line buffer mechanism for a drive-ratio control linkage of a transmission system in a human-powered vehicle is provided with a shift actuator adapted to displace the drive ratio control linkage in an upshift direction and a downshift direction through a range of positions between a maximum upshift position and a maximum downshift position, an input buffer member adapted to move in response to a displacement of the drive ratio control linkage; and a buffer spring preloaded to transmit an input displacement of the input buffer member to an output buffer member; wherein a displacement of the drive ratio control linkage in at least one of the upshift direction and the downshift direction transmits an effort to the input buffer member, and wherein the input buffer member is permitted enough displacement relative to the output buffer member to allow the buffer spring to absorb the entire range of displacement of the drive ratio control linkage in the effort transmitting direction.

In one embodiment of the buffer mechanism of the third aspect, the input displacement of the input buffer member relative to the output buffer member is rotational.

In another embodiment of the buffer mechanism of the third aspect, the input displacement of the input buffer member relative to the output buffer member is linear.

In a fourth aspect of the present invention, an enclosed chain drive system for a human-powered vehicle is provided with a plurality of axially spaced apart driven sprockets rotatably mounted to a vehicle frame; a drive sprocket rotatably mounted to the vehicle frame; a drive chain engaged to the drive sprocket and alternately engageable to any of the driven sprockets; a chain tensioner proximate to the drive sprocket adapted to maintain tension in a drive chain; a chain guide associated with a portion of the drive chain proximate to the driven sprockets; a derailleur actuator adapted to translate the chain guide in inboard and outboard directions, causing the drive chain to disengage one of the plurality of spaced-apart sprockets and engage an adjacent sprocket, thereby changing a chain drive ratio of a rotation of the engaged driven sprocket to a rotation of the drive sprocket; and an enclosure assembly substantially enclosing the transmission system; wherein the chain tensioner, chain guide and derailleur actuator are located substantially inside a horizontal perimeter of the vehicle frame.

In one embodiment of the fourth aspect of the present invention, the transmission system further comprises a planetary drive system associated with the drive sprocket, the planetary drive system comprising a ring gear integral with the drive sprocket; a planetary gear enmeshed with the ring gear, the planetary gear rotatably mounted to a spider member, the spider member rotatably mounted to the vehicle frame; a sun gear enmeshed with the planetary gear, the sun gear rotatably mounted to the vehicle frame; a ratchet integral with a first planetary member selected from the group consisting of the ring gear, the planet gear, the planet carrier, the sun gear and the frame; a pawl movably mounted to a second planetary member selected from the group consisting of the ring gear, the planet gear, the planet carrier, the sun gear and the frame; the pawl adapted to engage the ratchet to prevent a rotation of the first planetary member with respect to the second planetary member in a clockwise direction and disengage the ratchet to allow the rotation of the first planetary member with respect to the second planetary member in the clockwise direction; and a pawl actuator adapted to cause the pawl to engage and disengage the ratchet; wherein, when the pawl is engaged to the ratchet, the output rotation of an output planetary member is constrained to equal or exceed an input rotation of an input planetary member multiplied by a first planetary drive ratio, and when the pawl is disengaged from the ratchet, the output rotation of an output planetary member is constrained to equal or exceed an input rotation of an input planetary member multiplied by a second planetary drive ratio, the output and input planetary members selected from the group consisting of the ring gear, the planet gear, the planet carrier, the sun gear and the frame. The planetary drive system preferably provides a maximum overall drive ratio of an output rotation of the engaged driven sprocket to an input rotation of the input planetary member that is at least about four times its minimum overall drive ratio.

Preferably, the pawl of the foregoing embodiment is a compound pawl comprising a base member and a blocker member, the blocker member adapted to engage the ratchet to prevent a driven relative rotation of the first and second planetary members, and the base member movably mounted to the second planetary member at a base joint and the blocker member movably positioned with respect to the base member at an articulation juncture; wherein the compound pawl stably provides blocking forces to oppose a load tending to cause the driven relative rotation when the blocker member engages the ratchet and the relative configuration of the pawl blocker and pawl base members at the articulation juncture is stable, thereby preventing the driven relative rotation; and wherein the pawl actuator is adapted to apply a force to the compound pawl to cause the relative configuration of the pawl blocker and pawl base members to articulate into an unstable condition at the articulation juncture, thereby substantially releasing the blocking forces and allowing the driven relative rotation. The relative configuration of the pawl blocker and base members at the articulation juncture may be biased toward the stable configuration by a pawl reset mechanism.

BRIEF DESCRIPTION OF THE SEVERAL VIEWS OF THE DRAWINGS

FIG. 2a is a plan view of an embodiment of compound pawl 280 in which base pawl members 320 are two side links on each side of blocker pawl member 350.

FIG. 2b is a side view of the embodiment of compound pawl 280 shown in FIG. 2a, illustrating the engagement of blocker pawl member 350 to one of sun ratchet teeth 262.

FIG. 3 is a fragmentary front elevation view of a planetary drive system 100 with sun ratchet 260 blocked by the compound pawl 280 shown in FIGS. 2a-b.

FIG. 4 is a perspective view of a planetary drive system 100 mounted to a typical bottom bracket, with ring gear 190, planet carrier 130 and planet gears 200 removed from view, illustrating a preferred embodiment of compound pawl 280 in its load-stable blocking position, as shifting force F(s) is initially applied to pawl control cable 390.

FIG. 5 is a perspective view of planetary drive system 100 wherein compound pawl 280 has been pulled out of its load-stable over center condition so that a contact force at blocker contact point 360 continues to force compound pawl 280 to articulate out of the way of sun ratchet 260.

FIG. 6 is a perspective view of planetary drive system 100 wherein blocker pawl member 350 has just lost contact with sun ratchet tooth 262, and clamp pivot 352 between cable clamp 370 and blocker pawl member 350 has come into view.

FIG. 10 is a perspective illustration of the streamlined rear derailleur system of the present invention viewed from the non-drive side.

FIG. 10a is a bottom elevation view of chain guide 510 and a portion of drive chain 152.

FIG. 14a is a side perspective view of chain guide 510 removed from drivetrain 10 and enlarged to illustrate its contours and features.

FIG. 14b is a front elevation view of chain guide 510 with drive chain 152 passing through it.

FIG. 19 is a non-drive side view of enclosed drivetrain 10.

DETAILED DESCRIPTION OF THE INVENTION

Figure 9:
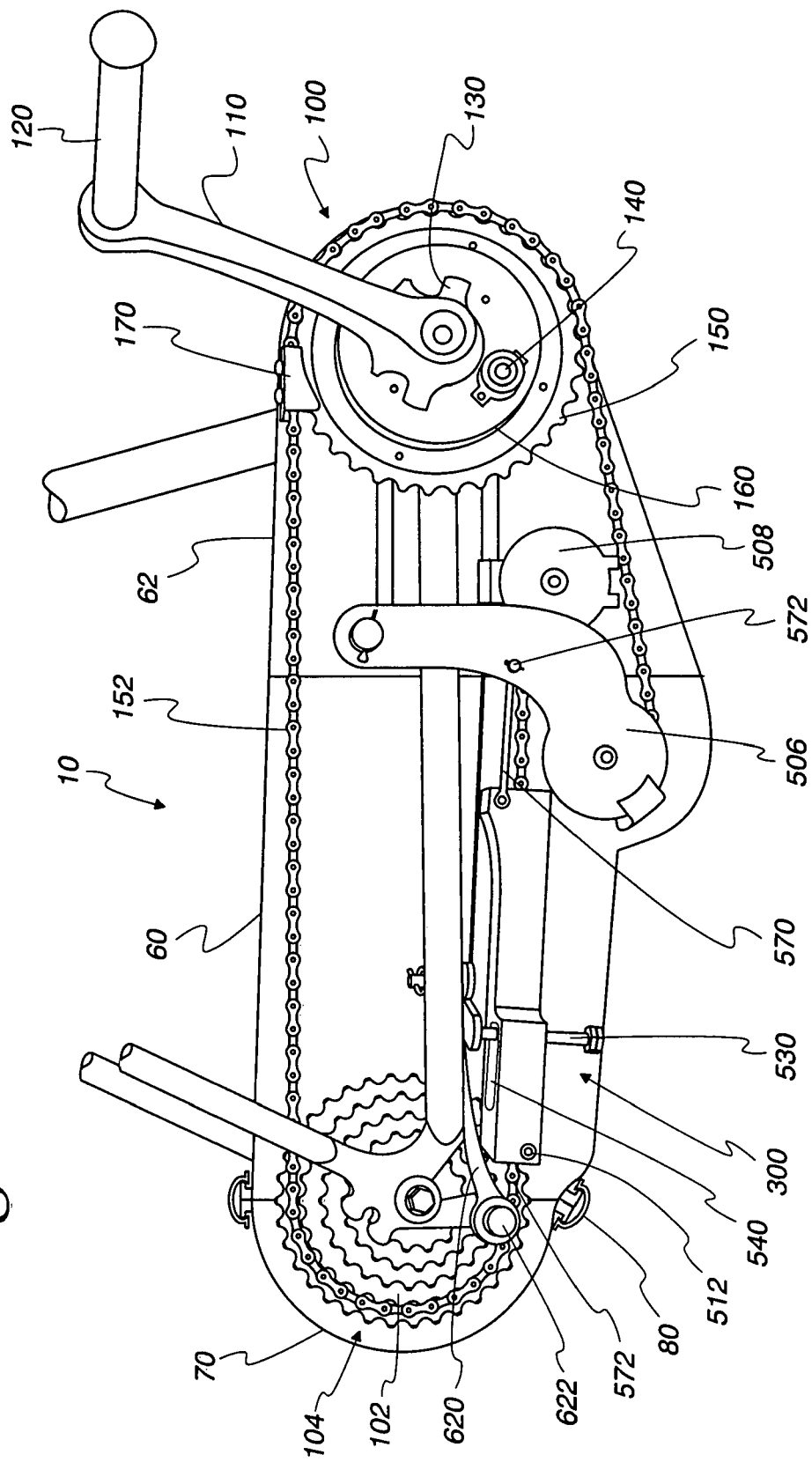
FIG. 9 is a drive-side view of the enclosed drivetrain 10, with panels removed from the drive side.
Figure 20:
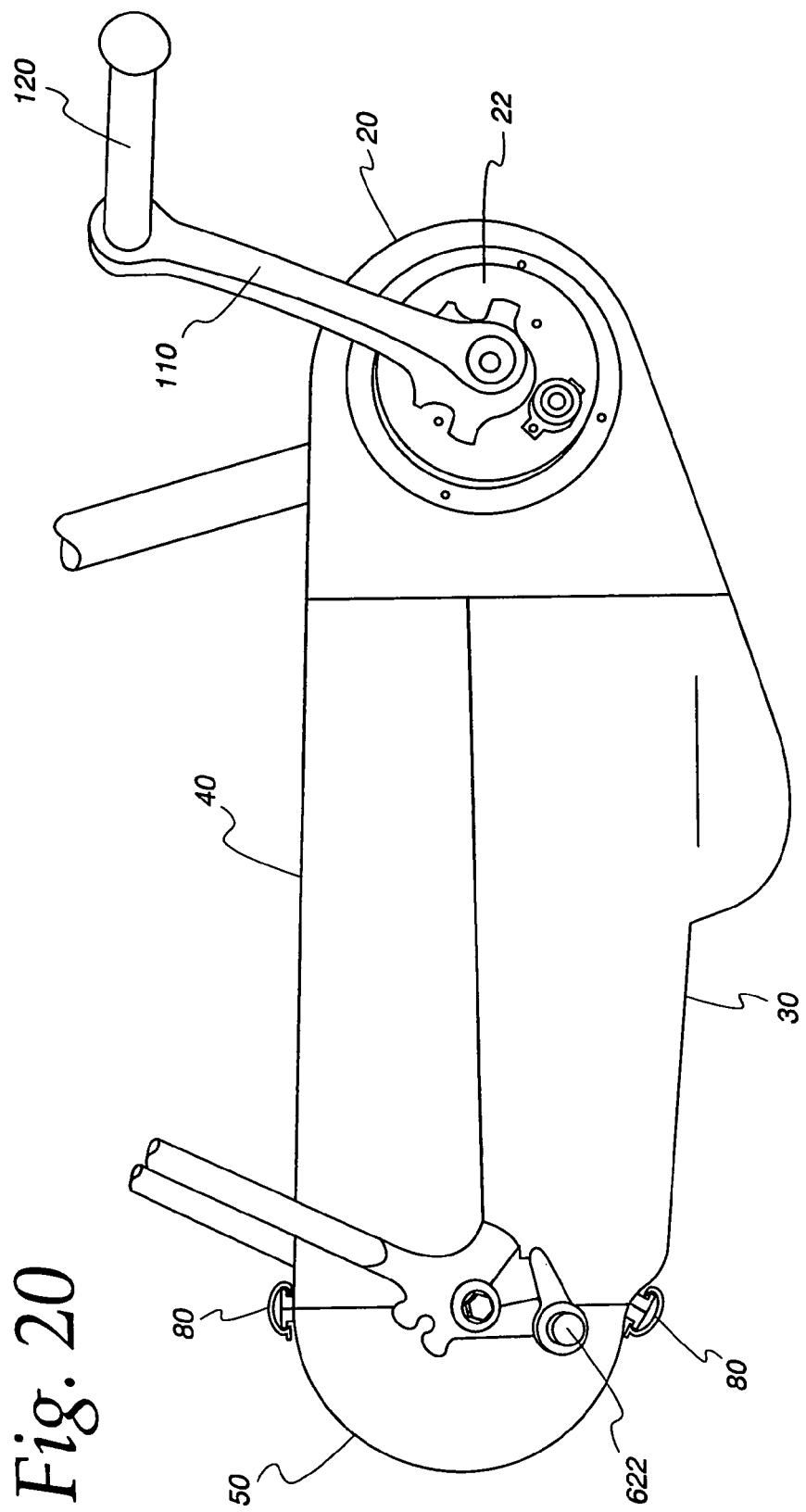
FIG. 20 is a drive-side view of enclosed drivetrain 10.

With reference to the attached Figures and particularly to FIGS. 9, 19 and 20, an enclosed bicycle drivetrain 10 with a front planetary drive system 100, a compact, multi-sprocket rear derailleur system having a separate chain tensioner 500 and chain guide 510, and a protective enclosure is described in this section.

The present invention uses a two- or more speed planetary drive system 100 to generate large drive ratio ranges. Planetary drive system 100 is associated with a pedal crank 110 and bottom bracket of a bicycle. Planetary drive system 100 is shiftable under full pedaling loads.

The present invention separates the chain tensioning function from the chain placement function of a conventional rear derailleur. Unburdening the rear derailleur of its chain tensioning function drastically improves the accuracy and reduces the effort to shift the rear derailleur. This is because the parallelogram of a conventional rear derailleur is loaded due to the tensioning pivot spring between the idler cage and the parallelogram. Thus, the parallelogram which moves to precisely place the chain on the destination sprocket is always loaded by the idler cage tensioning spring. This additional torsion load creates friction and wear at the four parallelogram pivots.

The use of a single chain ring 150 with internal planetary drive system 100 permits the chain tensioning function to be accomplished by a chain tensioner 500 proximate to single chain ring 150, and hence remote from rear sprockets 102, as illustrated in FIGS. 9 and 10. When a conventional front derailleur is used to direct the chain among two or three chain rings, any chain tensioner proximate the chain rings would need to track laterally to follow the chain as it is shifted. This need for lateral tracking has led modern component designers to simply place the chain tensioner on the rear derailleur so it automatically tracks with the chain.

The use of a single chain ring with or without internal gearing makes it feasible to place a fixed chain tensioner proximate the chain ring. Naturally, the tensioner operates on the slack side of the chain.

The present invention uses a rear derailleur which is free of its historical chain tensioning function. This permits the mechanism to be more specialized for effortless, responsive and accurate chain shifting and placing. The new simplified rear derailleur is also streamlined and easily fits substantially inboard relative to the frame or chain stay.

The absence of a front derailleur and the reduction in size and complexity of the rear derailleur enable the entire drivetrain 10 to be housed inside an enclosure. The usual trade-off between gearing range and enclosability is avoided. The present system provides the full range of gearing for the most demanding off-road applications while maintaining the benefits of a completely enclosed drive train. Ironically, it has been the off-road full gearing range drivetrain that has suffered the most from mud, sand and wetness.

DESCRIPTION OF THE INVENTION

The invention is comprised of three subsystems that interrelate and cooperate in a synergistic manner to enable the complete invention. First is planetary drive system 100 and its associated shifting mechanism. Second is a reconfigured streamlined rear derailleur system, having a separate chain tensioner 500 and chain guide 510, and its associated shifting mechanism. Third is the enclosure system that substantially completely isolates drivetrain 10 from wet and mud, while still enabling quick rear wheel removal.

The use of a planetary drive system to enable a single chain ring to rotate at various over- and underdrive ratios in addition to one-to-one creates an opportunity to build a full range transmission with a single chain ring arrangement. This makes it feasible, with a simple mechanism, to keep tension on the slack, non-driving side of the chain with a fixed tensioner system.

Planetary Drive System

Many planetary gearing schemes have been used on bicycles. The main problem with them is that, while it is easy to drop a ratchet into ratchet teeth integral with a sun gear, planet carrier or ring gear to block that planetary member from rotating, it is difficult to release the ratchet pawl while it is under load.

Figure 1:
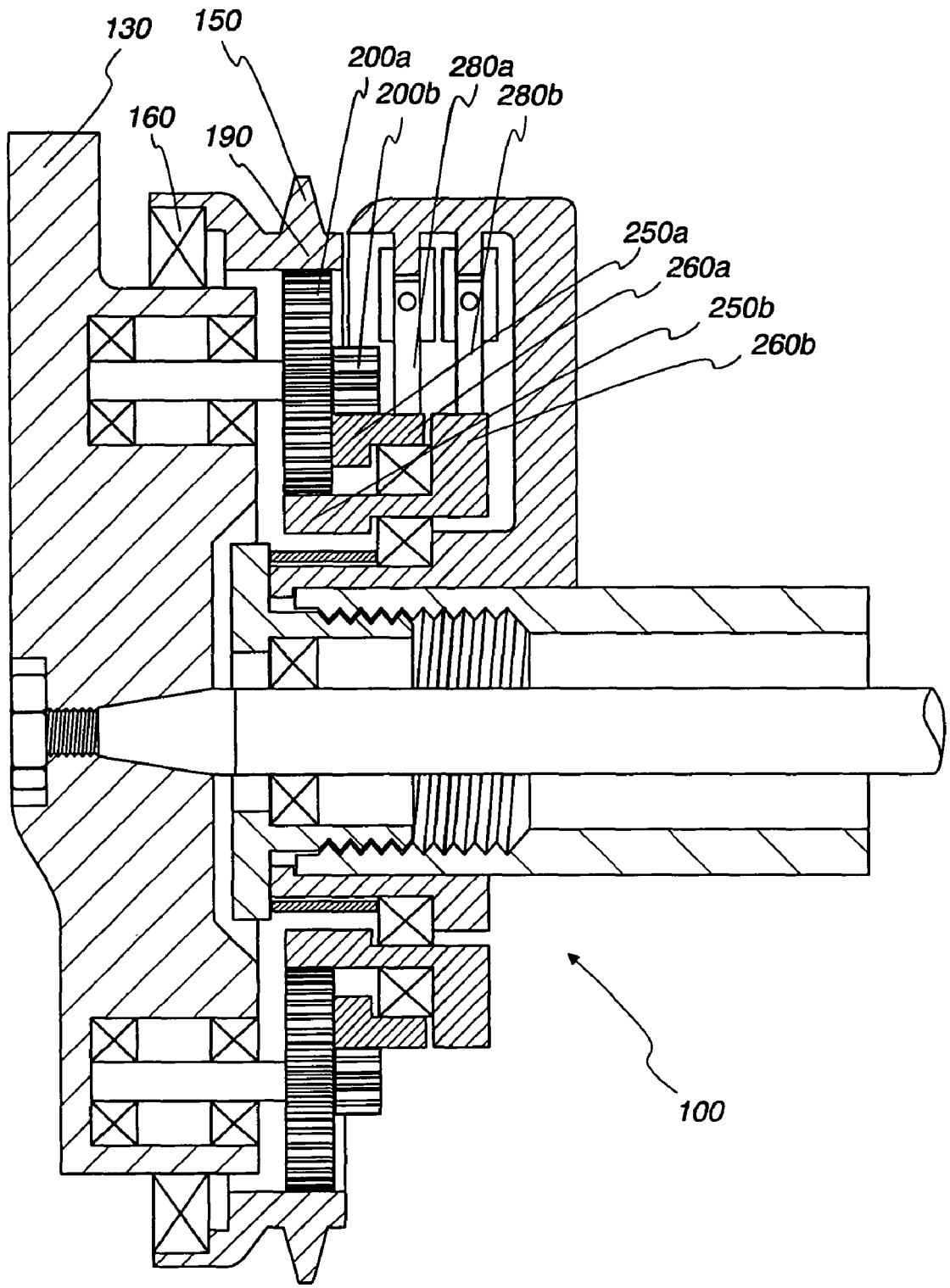
FIG. 1 is a side sectional view of a three-speed planetary drive system 100 in accordance with the present invention.

With reference to FIG. 1, planetary gearing consists of sun gears 250*a* and 250*b*, planet gears 200*a* and 200*b* rotatably supported by a planet carrier 130, and a ring gear 190. In low gear, one-way clutches between planet gears 200 and planet carrier 130 prevent the stepped planet gears from rotating in reverse with respect to planet carrier 130. Therefore, the gearing will rotate en masse when the pedal and crank are rotated in the forward direction.

For the first overdrive condition, a compound pawl 280*a*, described below in detail, is permitted to swing into engagement with a sun ratchet 260*a* integral with sun gear 250*a*. Compound pawl 280*a* prevents sun gear 250*a* from rotating in the forward direction. Therefore, planet gears 200*a* must rotate around the sun. This imparts a kinematic gain in speed to ring gear 190 which is integral with chain ring 150.

Similarly, allowing compound pawl 280*b* to engage sun ratchet 260*b* will force the transmission into an even higher output speed.

The challenge is to reverse the process while the transmission is under load.

A novel aspect of the present invention resides in the fact that it uses an articulated ratchet pawl, namely, compound pawl 280, which is ingeniously articulated to allow it to be easily released from engagement with a sun ratchet 260 integral with a sun gear 250 while under full load.

Referring to FIG. 4, a standard bicycle cable acting as pawl control cable 390 attaches to a base pawl member or members 320 between a base pivot 330 and an articulation pivot 340. Base pivot 330 is fixed with respect to the bottom bracket or frame member on which the transmission is mounted. The pawl consists of two articulated pieces. A blocker pawl member 350 is pivoted at articulation pivot 340 and has a finger portion on one side of articulation pivot 340 which engages ratchet teeth 262 of sun ratchet 260 to block sun gear 250. Blocker pawl member 350 also has a cable attachment on the other side of articulation pivot 340. Articulation pivot 340 is spring-loaded by an articulation return spring 310 so that blocker pawl member 350 is biased to an "over center" condition with respect to base pawl member 320. Base pivot 330 is biased to urge compound pawl 280 into engagement with sun ratchet teeth 262. In one embodiment, illustrated in FIGS. 2*a* and 2*b*, base pawl members 320 are a pair of side links, and pivots 330 and 340 may be formed by means of pins directed through the side links acting as base pawl members 320.

With reference to FIGS. 4-7, to downshift to a lower output speed, the cable force pulls on compound pawl 280 at the cable attachment. This pries compound pawl 280 past the over-center condition so that it can be forced out of the way of sun ratchet teeth 262, which are impelled to rotate into blocker pawl member 350 by a driving load torque on sun ratchet 260.

The process is reversed when the cable is released, permitting the compound pawl 280 to again block sun ratchet 260. Articulation return spring 310 keeps blocker pawl member 350 and base pawl member 320 in the over-center condition during, and preferably before, an upshift.

The benefit for downshifting under load is that the operator does not need to do all the work of prying a loaded pawl out of engagement, but only the work of bringing compound pawl 280 past its over-center, load-stable condition.

The current preferred embodiment of the compound ratchet also employs a cable clamp 370, as shown in FIGS. 4 though 7, with a pivot connection to blocker pawl member 350. The benefit of the extra pivot is that the cable is isolated from the approximately 90° of rotation of blocker pawl member 350 upon downshifting under load, and cable fatigue is less likely to result. The additional pivot and component also enable pawl control cable to be socketed in shifter 711 and clamped at the transmission in the conventional direction. This is desirable to keep shifter 711 as small and light as possible.

FIGS. 4 through 7 illustrate the preferred embodiment of the articulated pawl sun blocker in four phases of its mechanical cycle, as applied to a two-speed embodiment of planetary drive system 100. FIG. 4 shows the sun gear blocked by the articulated pawl 320. As mentioned above, blocker pawl member 350 is the part of compound pawl 280 that engages sun ratchet teeth 262 and pivots at articulation pivot 340 with respect to base pawl member 320. Articulation return spring 310 reacts between blocker pawl member 350 and base pawl member 320 to keep the pivot 340 over center with respect to the line between a contact point 360 at which blocker pawl member 350 contacts sun ratchet 260 and base pivot 330.

The system is shown in FIG. 4 with sun ratchet 260 blocked and overdrive engaged. Pawl control cable 390 is in a paid-out condition. Vector line F(s) indicates the direction of a shifting force pulled on pawl control cable 390. FIG. 4 illustrates the load-stable, over center configuration of compound pawl 280, just before the initiation of a shift by a shifting force F(s) applied. In this configuration, the center line extending from articulation pivot 340 through base pivot 330 passes above the center line extending from blocker contact point 360 through articulation pivot 340, as indicated in FIG. 4 by a counter-clockwise arrow.

Figure 7:
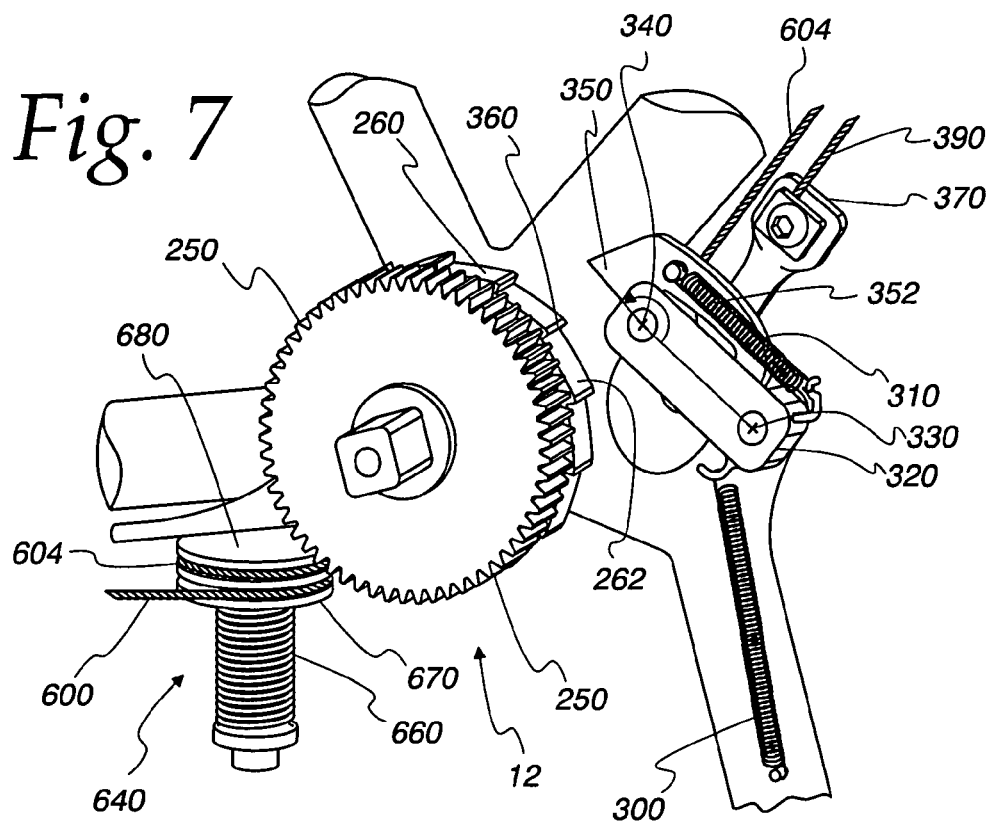
FIG. 7 is a perspective view of planetary drive system 100 wherein compound pawl 280 is fully disengaged from sun ratchet 260 and has been forced back to its load-stable over center condition by articulation spring 310.

As illustrated in FIGS. 5-7, when pawl control cable 390 is pulled, compound pawl 280 is pried past the over-center configuration, as indicated by the clockwise arrows showing the angle between the aforementioned centerlines in FIGS. 5 and 6, and then snaps out of overdrive causing the transmission to revert almost instantaneously to the previous load path and associated drive ratio as provided by planet gears 200 connected to a planet carrier 130 by means of a Sprag clutch 140, shown in FIG. 9.

Primary return spring 300 biases compound pawl 280 towards sun ratchet 260. As shown in FIG. 4, compound pawl 280 is urged to stay in position by springs 300 and 310. Articulation pivot 340 is up against a limit to its range of motion. Blocker pawl member 350 is prevented from rotating further clockwise relative to primary pawl 320 by a stop 342 striking the top of base pawl member 320.

The direction of cable force application is substantially perpendicular to the lever arm, to minimize parasitic friction forces; therefore, the system can be downshifted with fairly high through torques at moderate cable forces. For example, it can be easily downshifted using twist grip 720 with a 200-lb static load on a pedal spindle 120 in the horizontal "nine o'clock" position of a pedal crank 110.

The preferred embodiment of the invention uses a simple spool twist shifter as shifter 711. These shifters are simple and efficient. However, because the shifting forces are moderate, any form of cable actuator device would be acceptable.

FIG. 5 illustrates the system as pawl control cable 390 is being pulled. Blocker pawl member 350 has been rotated counterclockwise by cable forces applied at a clamp pivot 352, visible in FIG. 6, by cable clamp 370 as acted on by pawl control cable 390. The over-center condition relative to load point 360, pivot 340 and pivot 330 has been reversed, and blocker pawl member 350 is rolling out of engagement with ratchet teeth 260 associated with sun gear 250. If the planetary drive system 100 is loaded by pedal forces, those forces will force sun gear 250 to rotate clockwise, further displacing blocker pawl member 350 away from the ratchet teeth 262, as illustrated in FIG. 6. When free of ratchet teeth 262, blocker pawl member 350 snaps back to its pre-shift over-center position relative to base pawl member 320, as illustrated in FIG. 7. At this point, the system is in a non-overdrive condition, as sun gear 250 is free to rotate with pedal crank 110 as opposed to forcing planet gears 200 to rotate around it.

The conventional practice in this field teaches away from the compound pawl of the present invention. Normally, two or more diametrically opposed blocking pawls are used to prevent a planet gear, planet carrier, ring gear or sun gear from rotating. The purpose of this is to maintain concentricity. In general, it is a very good idea, as multiple clearances aggregate in a complex mechanism and, when loaded in one direction only, can cause excessive runout, friction, and wear of gears. However, in the present two-speed configuration, the single clearance, extreme simplicity and large contact area combine to make the single pawl feasible. One benefit of a single pawl is that energy-consuming pivots and linkages are not needed to coordinate a second pawl.

The preferred embodiment of the present invention is not a servo, but an efficient mechanism for freeing blocker pawl member 350 of compound pawl 280. The present system uses hand-generated cable forces to pry compound pawl 280 out of an over-center condition as it blocks sun ratchet 260, thereby preventing sun gear 250 from rotating. Thus, a further benefit of the present invention is that the rider need only work to bring the system out of the over-center condition. After the system is past the over-center condition, pedaling forces tend to snap compound pawl 280 the remainder of the way to its ready position for the next upshift. Thus, the system is partly servo to complete the downshift, although downshifting is initiated by hand-generated forces.

If greater throughput torques, resulting in more over-center forces, make the shifting force F(s) needed to downshift excessive, then a servo action can be created between rotating pedal crank 110 and compound pawl 280. Cable pull would position compound pawl 280 so that it interacts with projections on the planet carrier to cam compound pawl 280 out of engagement with sun ratchet teeth 262.

Referring now to FIG. 9, planetary drive system 100 is shown with the enclosure partly removed. Chain funnel 170 is used to ensure that waves of chain due to rapid upshifting or general rough riding do not flip drive chain 152 off of single chain ring 150. Chain ring 150 is integral with ring gear 190 as shown in FIG. 3, and is supported on planet carrier 130 by means of a chain ring bearing 160.

Figure 8:
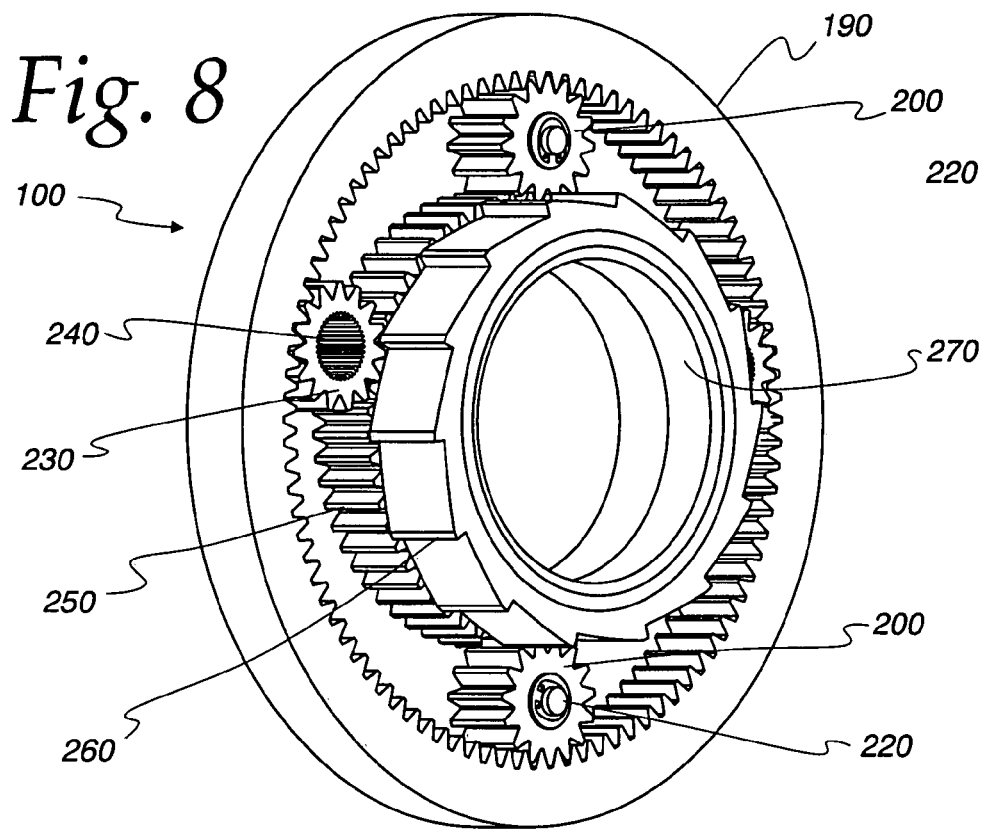
FIG. 8 is a perspective view of a two-speed planetary drive system 100 in which chain ring 150 has been detached from ring gear 190.

When sun gear 250 is blocked, as in overdrive, it is acted on by a single compound pawl 280. The resultant unbalancing or uncentering forces are balanced by a broad base of support 270 under the sun ratchet 260, as shown in FIG. 8. In the case of a two-speed configuration, there is no need for relative motion between a blocked sun gear 250 and the frame. A blocked sun gear 250 is motionless, but forces motion to occur around it. Therefore, the broad support 270 need not be frictionless. A simple bushing is adequate. When sun gear 250 does rotate, it is not loaded. Thus, a simple slip-fit is sufficient.

FIG. 8 shows the gears and ratchets for the two-speed configuration. Surface 270 is the surface broadly supported when sun gear 250 is pinned by compound pawl 280, as discussed above. Ratchet teeth 260 are integral with sun gear 250. Planet gears 200 are free to rotate about studs 220. Special planet gear 230 is supported on a live axle 240 which is acted on by a Sprag clutch 140, shown in FIG. 9. Sprag clutch 140 forces special planet gear 230, planet gears 200 and ring gear 190 to rotate only in the forward direction relative to carrier 130, also shown in FIG. 9.

Figure 22A:
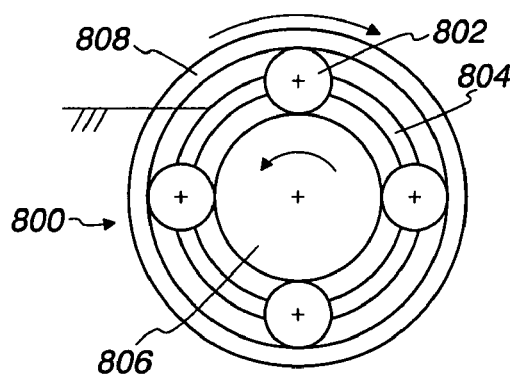
FIGS. 22a-f schematically illustrate some of the many possibly load-path schemes of an alternative planetary drive system 800 into which compound pawl 280 of the present invention may be advantageously incorporated.
Figure 22B:
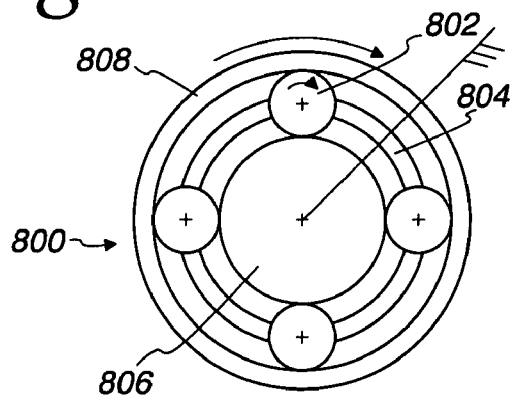
Figure 22C:
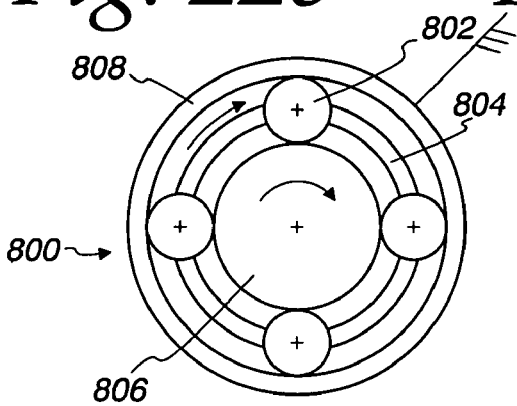
Figure 22D:
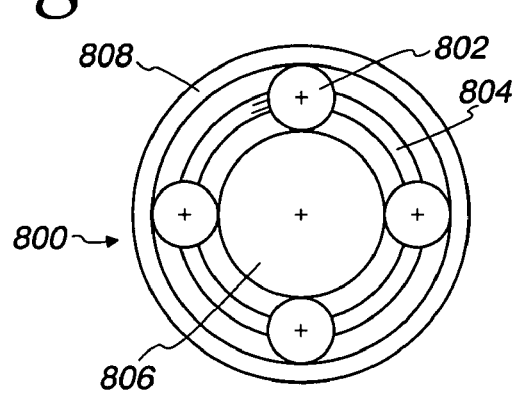
Figure 22E:
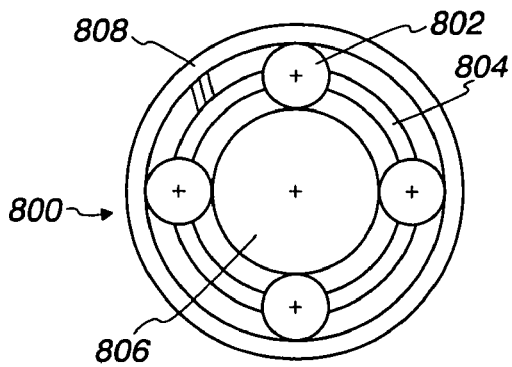
Figure 22F:
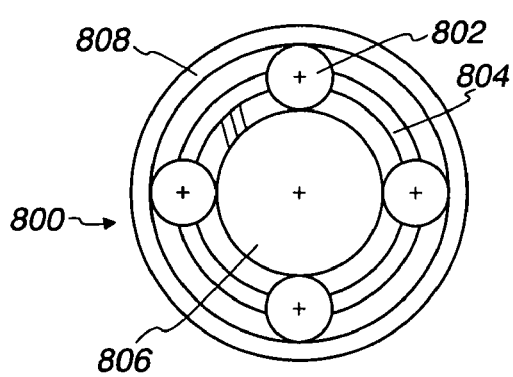

While the illustrated embodiment described in this section incorporates a planetary drive system 100 in which an input rotation is applied to planet carrier 130 to impart an output rotation to ring gear 190, compound pawl 280 that enables the illustrated planetary drive system 100 to shift under load is equally applicable to planetary drive systems using alternative load path schemes. Some examples of alternative planetary drive systems 800 are illustrated schematically in FIGS. 22a-f. As shown in FIG. 22a, fixing a planet carrier 804 to a frame (not shown) allows an input rotation of a sun gear 806 to impart an output rotation to a ring gear 808 in the opposite direction, or vice versa. Similarly, FIG. 22b illustrates a load path in which sun gear 806 is fixed to the frame and ring gear 808 or a planet gear 802 may be the input or output member, while FIG. 22c illustrates a load path in which ring gear 808 is fixed to the frame and sun gear 806 or planet carrier 804 may be the input or output member. FIGS. 22d-f illustrate configurations in which either planet gear 802, ring gear 808 or sun gear 806 is fixed to planet carrier 804, respectively. In each of the foregoing configurations, planetary drive system 800 rotates en masse and the ratio of an output rotation to an input rotation is 1:1 for any load path.

Many more permutations and combinations are of course possible. Also, the use of multiple sun gears, stepped planet gears, and one or more ring gears gives an infinite number of possibilities for the use of planetary drive systems and may be applied to vehicles, winches, fishing reels and other devices. Any of the aforementioned devices, without limitation, may advantageously incorporate compound pawl 280 of the present invention into their planetary drive systems.

In every case, it has historically been easy to deploy a conventional ratchet pawl to block relative movement of ratchet teeth in at least one direction of movement, typically permitting relative movement in the other direction. The pawl may be associated with any of the members of a planetary drive system (housing or frame, sun gear, planet gear, planet gear carrier, or ring gear). Likewise, the ratchet teeth may be associated or integral with any of the components of a planetary drive system as enumerated above.

One of the novel and beneficial aspects of compound pawl 280 of the present invention is it can be disengaged from ratchet teeth 262 using minimal effort while planetary drive system 100 is being operated under full load. This enables the load path to be restored as it was before compound pawl 280 was deployed to alter the load path. In contrast, a conventional pawl is difficult if not impossible to disengage while the transmission is loaded unless an additional servo mechanism is employed to force it out of engagement to the ratchet teeth. Servos are commonly used to force pawls out of engagement, but the disadvantage is that servos require additional mechanism to derive energy from the transmission itself to force the ratchet out of engagement. One known example uses a pilot mechanism commanded from a handlebar shifter to move a cam follower to a position between the pawls and a cam integral with the pedal spindle to force the pawls out of engagement with ratchet teeth formed in the inside diameter of the sun gears. The additional mechanism adds weight and complexity to the shifting system. The use of a pilot mechanism to control a slave servo mechanism as described above also results in a delay between the shift command and the resulting shift.

Compound pawl 280 of the present invention avoids the complexity and the delay associated with a servo mechanism.

In the preferred embodiment, compound pawl 280 deploys from a cocked position in which its articulation is retained in a stable configuration. When compound pawl 280 is deployed, it moves into position to transmit the blocking force from one of the members of a planetary drive system enumerated above to another member. Compound pawl 280 is thus retained in a configuration stable enough to transmit the compressive blocking force. When it is desired to release compound pawl 280 to terminate the blocked condition, it is merely necessary for pawl control cable 390 to destabilize compound pawl 280 so that it collapses under compressive loading. Pawl control cable 390 is only required to input enough work energy, as force times displacement, to bring the stable equilibrium condition of compound pawl articulation pivot 340 just into an unstable equilibrium condition. At that point, energy from the transmission itself forces blocker pawl member 350 to complete its movement pattern so that it is forced to a position clear of ratchet teeth 262. The foregoing mechanism is unique among mechanisms that permit shifting under load in that the initiation of the shift occurs instantaneously with the command to shift, rather than later, such as in the cammed pilot mechanism mentioned above.

Compound Pawl

In the preferred embodiment illustrated in the Figures, the two structural members of compound pawl 280, namely, blocker pawl member 350 and base pawl member 320, are under compressive loads when blocking. However, many alternative compound pawl configurations embodying the present invention are possible.

FIGS. 24A through E illustrate some alternative structures which also employ the underlying principles of the invention. FIGS. 24F and G are graphical representations for the purpose of the following discussion.

FIG. 24F shows a round member 950 in four positions relative to a contoured base member 954. A blocking force, F(B), is shown acting vertically downward forcing round member 950 against base member 954. The actuation force, F(A), is shown acting horizontally to the right. In the stable blocked condition, there is no force to push round member 950 from stable position P to unstable position Q. Round member 950 remains stably located in position P and is in a position to block relative rotation between two members of a planetary system. In position P, round member 950 is in stable equilibrium with respect to blocking force F(B).

When it is desired to release the blocked condition, an actuation force F(A) is applied to round member 950 to force it to move to and just past position Q. In position Q, round member 950 is in a slightly higher potential energy state with respect to blocking force, F(B), and is also in a state of unstable equilibrium with respect to the blocking force, F(B). When actuation force F(A) further causes round member 950 to move just past position Q, blocking force F(B) automatically causes round member 950 to continue to move through position R to position S. Position R is a blocking boundary.

When round member 950 is downhill of the blocking boundary, it is completely clear of the members it was previously blocking.

A small net actuation force acting on round member 950 for a small displacement initiates a movement or a change in equilibrium condition that is automatically completed to an unblocked state. The blocking force, F(B), helps complete the movement once initiated past position Q. A small actuation force multiplied by a small displacement, i.e. the distance from position P to Q, equals a small amount of energy or effort to accomplish the shift.

Figure 24A:
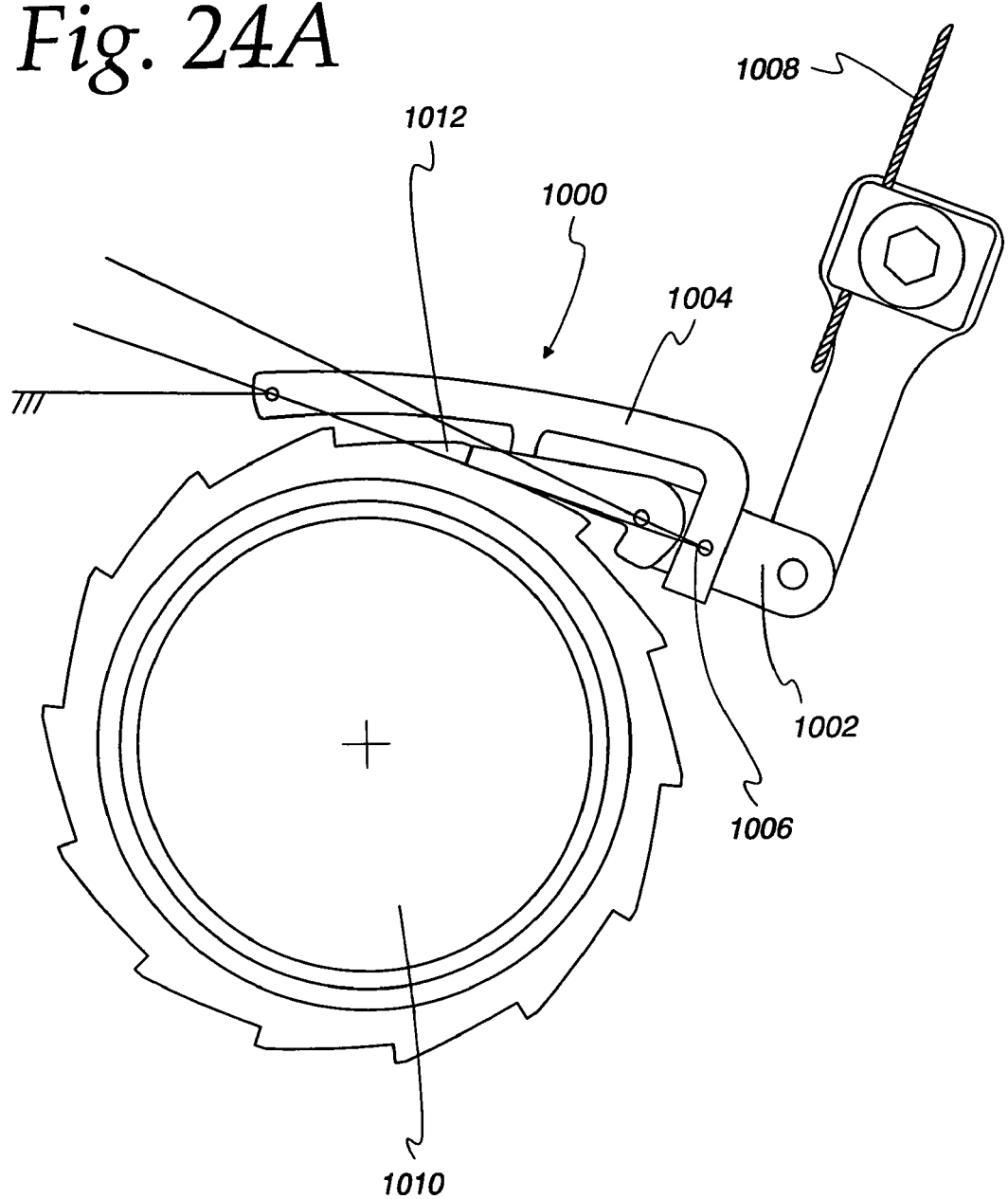
FIGS. 24A-E are side illustrations of alternative embodiments of pawls incorporating the pawl principle of the present invention.
Figure 24B:
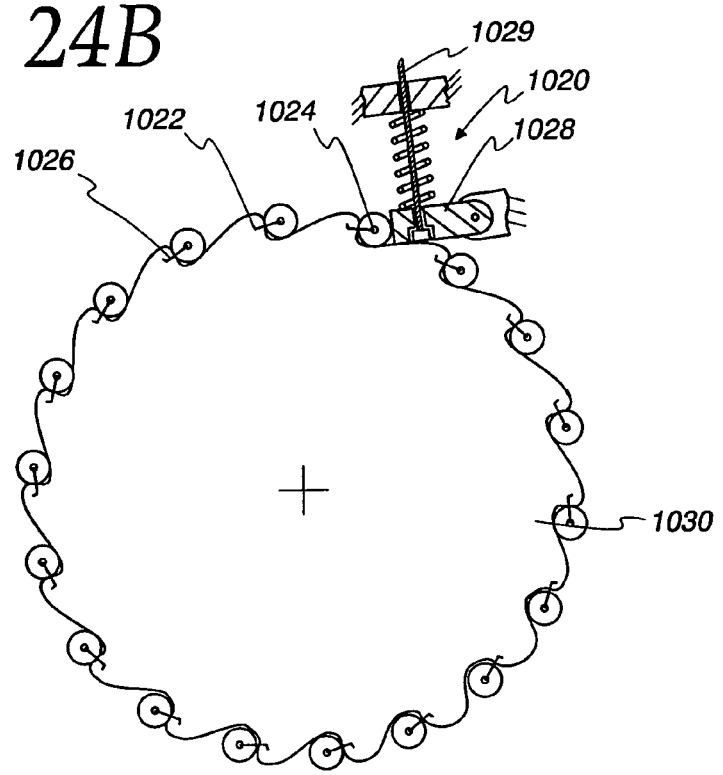
Figure 24C:
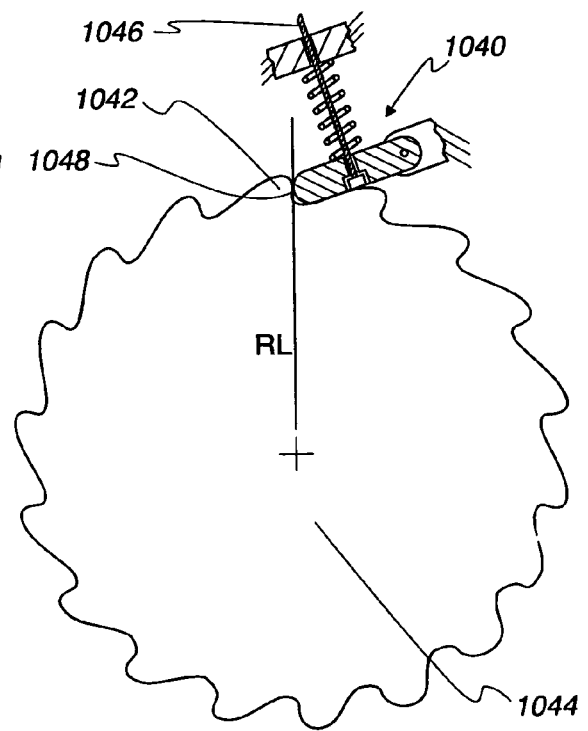
Figure 24D:
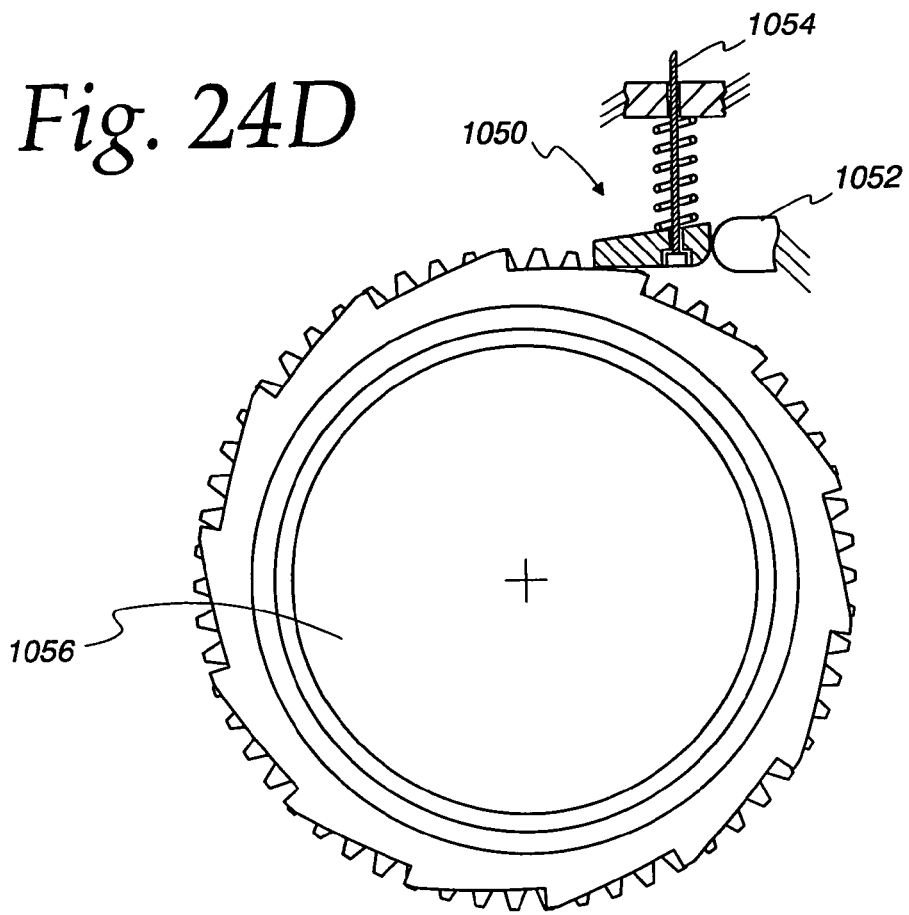
Figure 24E:
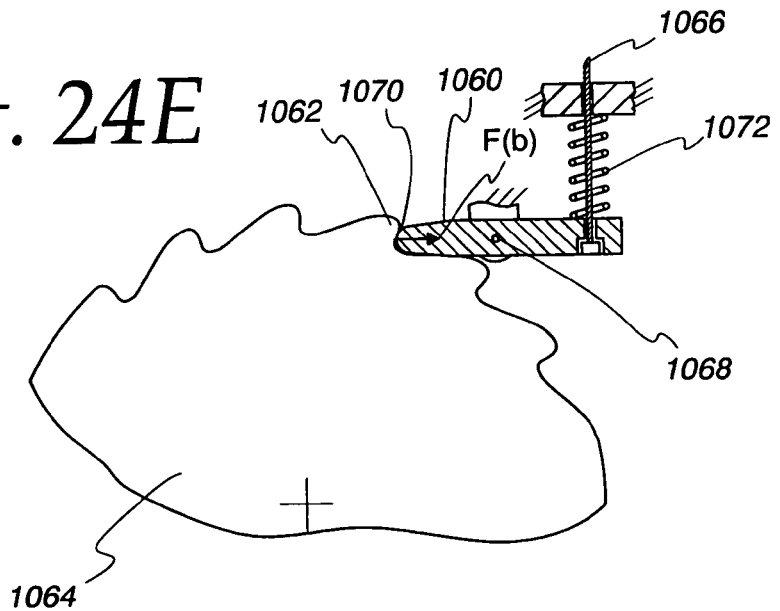
Figure 24F:
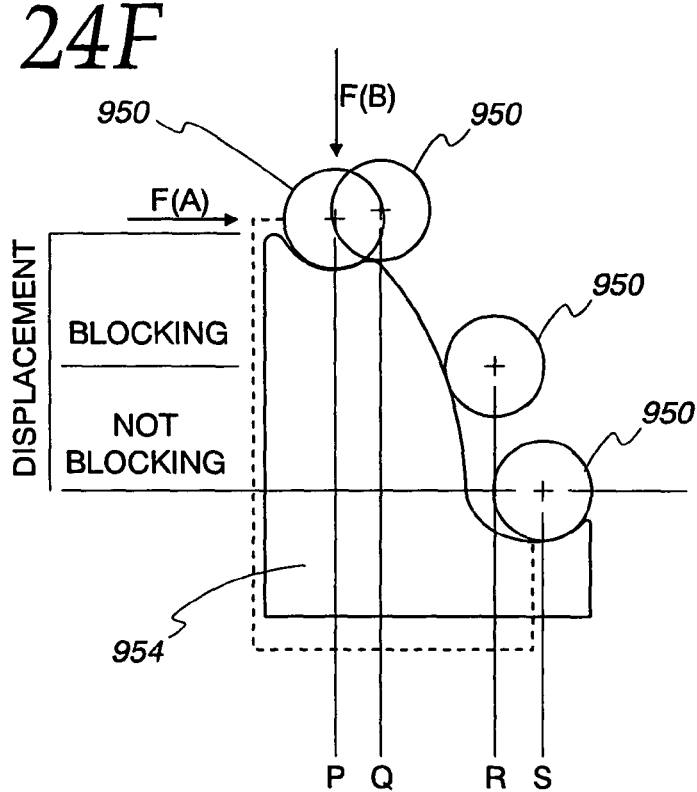
FIGS. 24F and G are demonstrative graphical representations illustrating the pawl principle of the present invention.
Figure 24G:
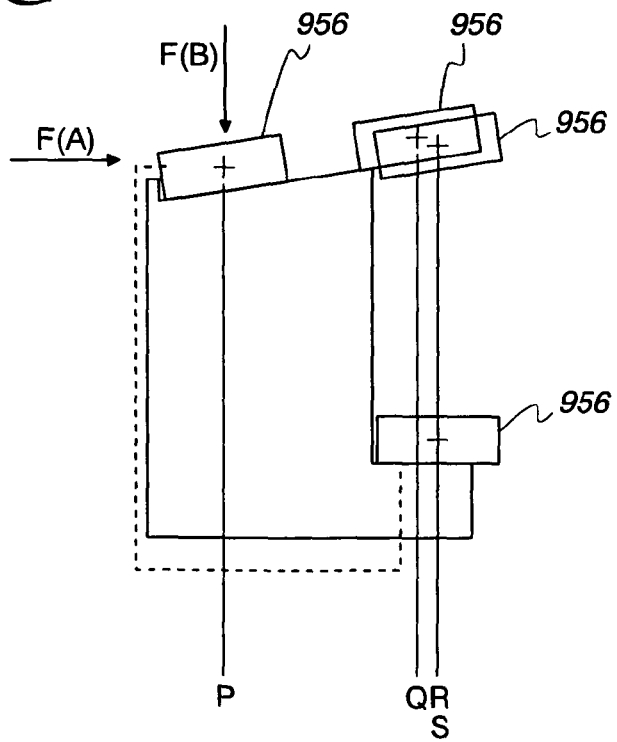

The situation corresponding to a conventional pawl is represented in FIG. 24G. Round member 950 is replaced by a rectangular member 956. This is meant to represent the fact that the contact angles between conventional ratchet pawl and teeth do not change much until the ratchet pawl is nearly clear of a ratchet tooth.

Position P again represents a stable equilibrium position relative to blocking force F(B). In this case to cause a shift, actuation force F(A) must act on rectangular member 956 for a much longer distance to bring rectangular member 956 to position Q where it is finally unstable and collapses through position R, the blocking boundary and finally resides at position S, the released position. Actuation force F(A) must act alone opposing the considerable friction forces generated by blocking force F(B) to bring the ratchet to position Q which is nearly coincident with position R. The blocking force F(B) opposes this movement until it is nearly complete. The actuation force F(A) acting over a relatively long distance results in a relatively large amount of energy expended to complete the shift. This is in contrast to the present invention, wherein the blocking force takes over earlier to help complete the shift.

In the invention, position Q, the transition point between a stable and unstable configuration, is preferably as close to position P as possible. In a conventional system, position Q is substantially farther along the displacement path. According to the invention, blocking force F(B) is recruited to assist the shift once initiated by the control force F(A). In the conventional system, control force F(A) must act substantially alone to bring the pawl clear of the teeth.

A stable equilibrium condition is used that is geometrically not much different from an unstable condition from which the structure collapses or buckles from a blocked position to a non blocked position relative to the planetary members. In an alternative embodiment, position P and position Q are geometrically coincident and the conversion from stability to instability occurs due to a change in net force applied to the pawl by the control cable and return spring. This is discussed below with reference to FIG. 24E.

When it is desired to restore the blocked condition, all that is needed is to block one of the ratchet teeth. The compound pawl or round member need only be placed in the way of an advancing tooth so as to block further rotation of its associated planetary member. The energy path to reposition the compound pawl or round member to the blocking position does not involve opposing the blocking force until the compound pawl is in position to block. A large force is exerted for substantially no displacement at the onset of blocking In FIG. 24F this would be represented by round member 950 "sneaking" around the back side of base member 954 and traveling a vertical path to again reside in position P, the stable blocking position. This is indicated by the dotted line in FIG. 24F. Round member 950 sneaks back in position while avoiding blocking force F(B) until it is in a stable position to catch and block the next advancing ratchet tooth. The space between the ratchet teeth provides time for this to happen.

These underlying principles will now be discussed in connection to a variety of possible structures as illustrated in FIGS. 24A through E.

FIG. 24A illustrates an alternative compound pawl 1000 wherein a blocker pawl member 1002 is in compression. Base pawl member 1004 supports blocker pawl member 1002 and is pivoted to the frame. The articulation between the base pawl member and the blocker pawl member is a rolling contact. A spring clip 1006 flexibly holds blocker pawl member 1002 in position relative to base pawl member 1004 as shown. When the control cable 1008 pulls up on blocker pawl member 1002, blocker pawl member 1002 rolls counterclockwise. This is analogous to round member 950 in FIG. 24F moving from position P to just past position Q. As the system moves from position P to position Q, ratchet wheel 1010 will be forced to rotate very slightly in the counter clockwise direction. This is analogous to the hump between position P and position Q in FIG. 24F. This corresponds to an increase in potential energy of the system relative to the blocking force F(B). When blocker pawl member 1002 rolls counterclockwise far enough to allow ratchet wheel 1010 to just begin rotating in the clockwise direction, the system is just past position Q in FIG. 24F and will be driven to position S as advancing ratchet teeth 1012 force compound pawl 1000 out of the way. Once blocker pawl member 1002 is out of the way and clear of the blocking force, spring clip 1006 can reposition blocker pawl member 1002 into the stable configuration with respect to base bawl member 1004. When control cable 1008 is released, compound pawl 1000 can drop in the way of an advancing ratchet tooth 1012 and block its movement. This corresponds to the dotted line path in FIG. 24F.

FIG. 24B shows another possible compound pawl 1020 according to the invention. Each ratchet tooth 1022 is provided with a roller 1024 retained against a curved face of tooth 1022 by a spring clip 1026. Base pawl member is pivotally supported on the frame. The system is shown in the stable blocking position corresponding to position P in FIG. 24F. For the system to be in stable equilibrium with respect to the blocking forces, it is necessary that the combination of contact angles and pivot produce an small increase in energy state of the system with respect to the blocking forces as control cable 1029 begins to pull upward on the base member to bring the system into an unstable equilibrium condition. This corresponds to round member 950 in FIG. 24F moving from position P to Q. It also corresponds to a slight rotation of ratchet wheel 1030 in the counterclockwise direction. After the next small increment of cable motion upward, the system will collapse allowing ratchet wheel 1030 to rotate freely in the clockwise direction. The contact angle between each curved ratchet tooth 1022 and its associated roller 1024 changes as roller 1024 is rolled upward. This changes the direction of force and destabilizes the system so that it can collapse.

When compound pawl 1020 is free of the ratchet wheel 1030, spring clip 1026 brings roller 1024 back into a stable configuration with respect to the face of ratchet tooth 1022. It is now ready to stably block rotation when control cable 1029 is again released.

It is important to note that a compound pawl according to the present invention may be separated at any juncture when in the non blocking position. The stable association need only take place when the system is deployed to block relative rotation of the planetary members.

FIG. 24C shows yet another possible pawl 1040 in accordance with the invention. Pawl 1040 is a single element and its "complex" nature lies in the fact that its rounded contacting surfaces on the pawl and ratchet tooth interact to produce the operative principle illustrated in FIG. 24F. Pawl 1040 is shown in the stable blocking position with respect to a tooth 1042 of a ratchet 1044. The contact angle between the curved surfaces of pawl 1040 and tooth 1042 produce the effect that as cable 1046 pulls upward on pawl 1040 to bring the system from position P to position Q of FIG. 24F, there will be a slight increase in potential energy of the system with respect to the blocking forces. Correspondingly, this must involve a slight counterclockwise rotation of ratchet 1044. This initial rotation may be imperceptible to the naked eye, but it can be measured. The initial counter rotation of the ratchet wheel corresponds to the hump between positions P and Q in FIG. 24F. In other words, the contact angle in the stable blocked condition is rotated slightly clockwise relative to a radial line RL drawn from the center of ratchet wheel 1044 to a contact point 1048 between the curved surfaces. As cable 1046 pulls pawl 1040 upwards, the curved surfaces meet at a different point and the contact angle shifts counterclockwise. When the contact angle passes through the radial line RL, the system collapses allowing rotation of ratchet wheel 1044 in the clockwise direction.

When control cable 1046 is again released, pawl 1040 drops into the way of a ratchet tooth 1042. All that is necessary to stably block rotation of the planetary members is that the contact angle at initial contact be slightly clockwise of radial.

In this example, the pawl is a single element with a complex interaction with the ratchet teeth such that only a small amount of input energy is required to bring the system to an unstable state where the ratchet wheel impels the pawl to displace further to completely clear the path of the ratchet teeth. In other words, the curved surfaces interact during a shift to make positions P and Q as close together as possible.

FIG. 24D shows yet another possible configuration of the invention. The interaction of curved surfaces to bring positions P and Q as close together occurs between the back of pawl 1050 and a curved support 1052 fixed to the frame of the planetary drive system. In these illustrations, hatched lines indicate that a corresponding feature is fixed. The complex pawl system is again shown in the stable blocked condition. A slight amount of pull of cable 1054 upwards brings the system into an unstable condition, allowing ratchet 1056 to rotate in the clockwise direction. The contact angle at the curved surfaces rotates counter clockwise as pawl 1050 is lifted.

FIG. 24E shows yet another possible configuration of the invention. In this configuration, the spring biasing force on pawl 1060 is reversed. The curved surfaces between pawl 1060 and teeth 1062 of ratchet 1064 serve to bring position P, the stable configuration, and position Q, the unstable configuration, as close together as possible. In fact, they are substantially coincident. Constant tension in cable 1066 keeps pawl 1060 in a stable equilibrium condition. The contact angle between ratchet tooth 1062 and pawl 1060 is not sufficient by itself to stably support blocking force F(B). When the cable tension is released, the net effect of forces applied to pawl 1060 at pivot 1068, contact point 1070 with ratchet tooth 1062, and cable return spring 1072 combine to rotate pawl 1060 clockwise, bringing it out of engagement with ratchet tooth 1062. In this configuration, positions P and Q are geometrically substantially coincident. The difference between the stable position P and the unstable position Q is that the cable force acts as to stabilize pawl 1060 in position P and is released to destabilize the pawl in position Q. From the destabilized position Q, the system collapses, recruiting blocking force F(b) to complete the movement through position R to position S.

When it is desired to again restore the blocked condition, control cable 1066 pulls upward, swinging pawl 1060 into stable position P. Constant cable tension is required to maintain position P.

Another example of a mechanism which could be employed to block members of a planetary drive system according to the present invention would be a "ball point pen" type mechanism, not pictured. In the common ball point pen which alternately extends and retracts in response to depression of a button at the end opposite the writing ball. In this example, the pen is extended for writing and held in a stable equilibrium condition for the purpose of withstanding the compressive forces on the ball during writing. When the button is again depressed slightly, the telescoping mechanism is brought just past an unstable equilibrium condition and then the return spring pulls the writing ball back into the pen body. A mechanism analogous to the pen could be configured to block planetary members according to the present invention. To illustrate, a pivot support is placed near a "button" end of the "pen" so that the ball end of the pen can be swung into and out of the path of the ratchet teeth. The "button" is pushed to extend the "writing ball" when the "pen" is swung out of engagement to the ratchet teeth. This is the cocked position ready for deployment. When deployed, the "pen" pivots into a position such that the "pen" transmits compressive forces from a ratchet tooth to the pivot. To release the ratchet tooth under load, the "button" is pushed the small distance needed to bring the "pen" from the stable equilibrium condition to just past the unstable equilibrium condition. At that point, the "pen" telescopes and collapses as the ratchet teeth resume their movement past the pivot. The "pen" is then swung back to the cocked position and the "button" is pushed a longer distance to again extend the "writing ball" and lock it in a stable equilibrium condition ready for the next deployment.

These examples are given not to limit the possible embodiments of the present invention, but to illustrate the underlying mechanism which the inventor claims is novel and beneficial as applied to the control of a planetary drive system. In these examples, an articulated blocking mechanism acts as a conventional pawl when initially deployed to block members of a planetary drive system. The articulated blocking mechanism is held in a stable equilibrium configuration when deployed. When it is desired to unblock the planetary drive system, all that is necessary is to add energy to the articulated blocking system to bring it just past an unstable equilibrium condition so that it collapses or releases. Once the blocking load is released, a biasing apparatus restores the articulated blocking system to a cocked position with the articulations restored to a stable configuration ready for the next deployment.

Rear Derailleur

A drag link 570 between chain guide 510 and chain tensioner 500 enables a relatively constant chain gap 572-574 between the chain guide and a particular destination sprocket 102.

Rear Derailleur

A rear derailleur having a chain tensioner 500 and a chain guide 510 is illustrated in FIGS. 9 through 14. Chain tensioner 500 pivots about a spring cavity 501. Spring cavity 501 is fixed to bottom bracket inner plate 62. Tensioner idler cage 504 supports an idler sprocket 503 which is guarded by a guard plate 506. Guard plate 506 is positioned to keep the chain on the idler sprocket 502. Chain tensioner spring 505, shown in hidden view in FIG. 10, biases idler cage 504 to rotate away from chain ring 150. As illustrated in FIG. 9, these members cooperate together to pull idler sprocket 502 away from the chain ring 150 so as to maintain tension in drive chain 152.

As shown in FIGS. 9 and 10, chain tensioner 500 rotates so as to displace a primary idler sprocket 502 with respect to a secondary idler sprocket (covered by secondary idler sprocket cover 508, shown in FIG. 9) to tension the slack side of chain 152. The slack must be paid out or taken up as more or less chain is required to loop around respective rear sprockets 102 of rear sprocket cluster 104.

If tensioner 500 is placed so that it pays out tensioned chain generally toward the pickup tangent points on the respective rear sprockets 102, then the streamlined derailleur is left with only the task of controlling the lateral displacement of the chain as it approaches the various freewheel or cassette sprockets, which is performed by chain guide 510. The lateral displacement is crucial to control, but the vertical displacement may be permitted to float as it is a consequence of the chain tension and inertial effects that are relatively unimportant to smooth shifting and smooth running.

The fore to aft position of chain guide 510 is conveniently controlled by a drag link 570 connected by means of a pivot 57 to idler cage 504. Movement generated by idler cage 504 is used to automatically maintain a minimal "chain gap" 572, referring to the portion of drive chain 152 extending between chain guide 510 and a destination sprocket 102.

Figure 11:
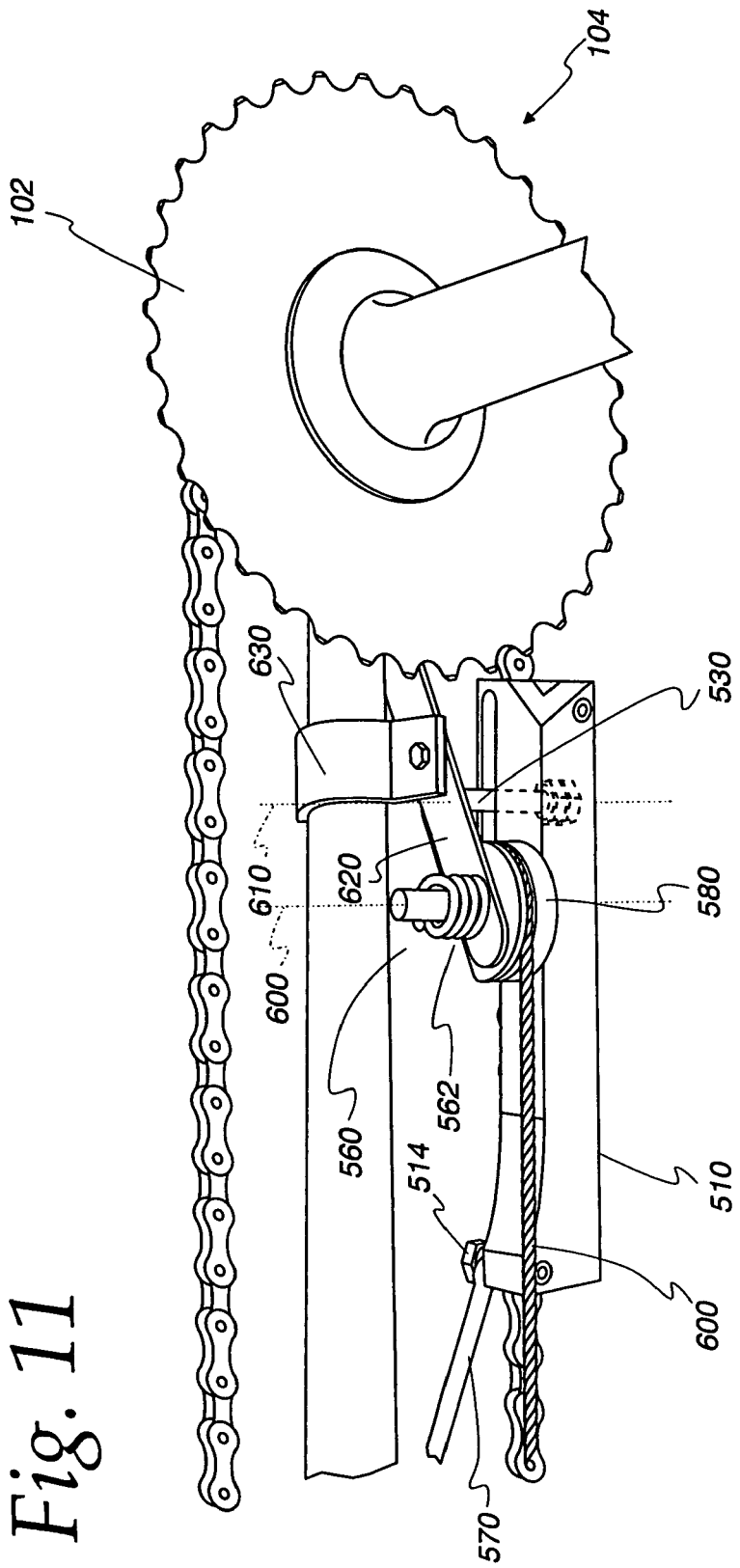
FIG. 11 is a perspective view from the non-drive side showing the structural elements of chain guide 510 as they relate to rear sprocket cluster 104 and as they are mounted to a typical bicycle frame.
Figure 12:
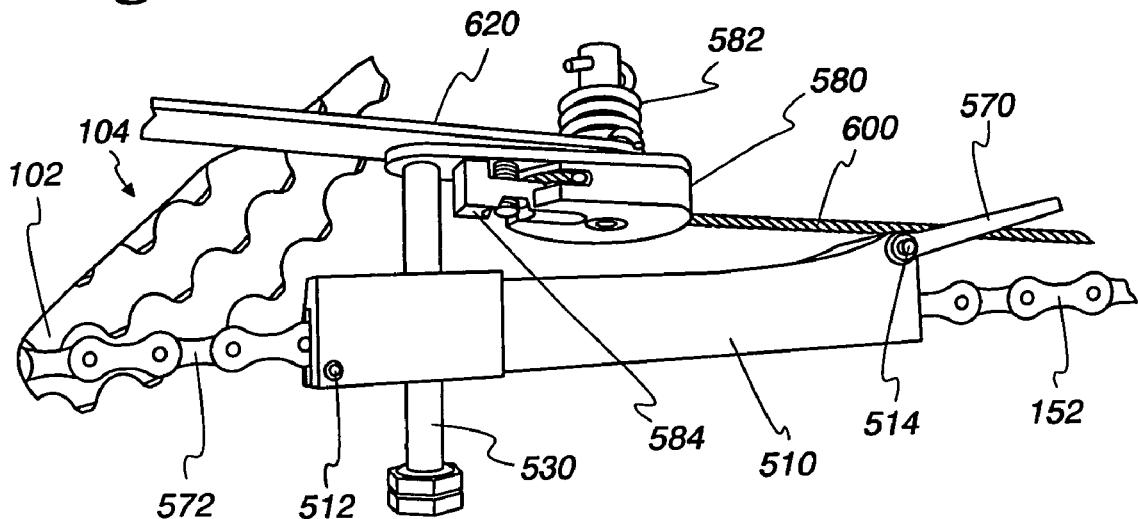
FIG. 12 is a perspective view of chain guide 510 and rear sprocket cluster 104 seen from below the drive side looking up.
Figure 13:
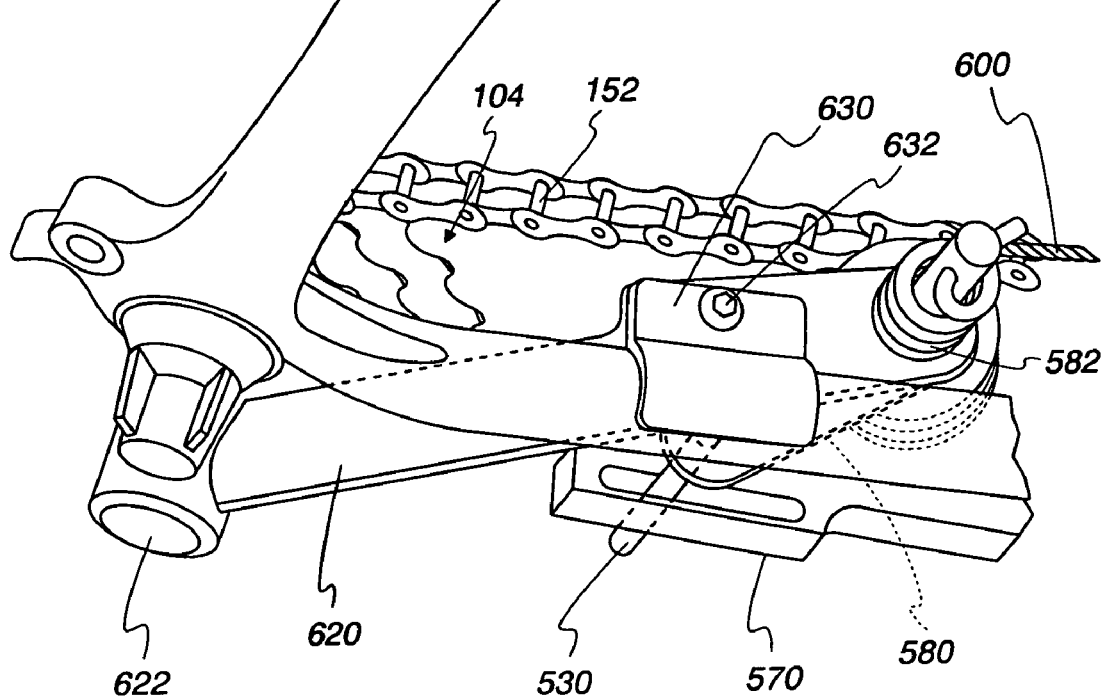
FIG. 13 is a perspective view of the chain guide 510, bell crank pivot support member 620, and rear sprocket cluster 104, showing where bell crank pivot support member 620 attaches to a typical bicycle frame with a primary bell crank pivot support member bolt 622.

Lateral movement of chain guide 510 is imparted by a bellcrank 580 acted on by a control cable 600. A bellcrank return spring 582 biases bellcrank 580 to pull against cable 600; i.e., bellcrank 580 is biased to rotate counterclockwise looking down, as in FIG. 10. Bellcrank pivot axis 602 is provided with a bushing integral with bellcrank support member 620, which is fixed to the bike frame by means of a primary bellcrank support member bolt 622, as shown in FIGS. 9, 11 and 13. A bellcrank control arm 530 slides in a chain guide slot 540 in chain guide 510. Cable pull rotates the bellcrank 580. This in turn displaces control arm 530. The lateral position of the chain guide 510 is precisely controlled by sliding contact between the control arm 530 and the chain guide slot 540. The fore to aft position of chain guide 510 is beneficially controlled via drag link 570 bolted to the forward end of chain guide 510 and pivotally mounted to idler cage 504 via a pivot 572. The drag link 570 is moved fore and aft by the idler cage 504 in a coordinated manner to maintain a minimal chain gap between the chain outlet end of the chain guide 510 and a destination sprocket 102, while at the same time preventing chain guide 510 from impinging on a larger sprocket during a downshift from a smaller sprocket 102.

This chain positioning system allows drive chain 152 to float in the vertical direction. This is a further step to ensure that chain guide 510 is not loaded by forces other than those necessary to displace drive chain 152 to a new destination sprocket 102 during a shift, or to simply maintain the current accurate placement of the chain on a selected sprocket 102 for smooth running. A goal of this system is to reduce the force to actuate a shift to the absolute minimum while assuring accuracy of chain placement. In circumstances where the vertical float could prevent sufficient chain wrap, chain guide 510 can be provided with a drive chain fairing or pulley for lifting the chain higher as it approaches a destination sprocket 102. A compression spring fitted against the locknuts at the bottom end of bellcrank control arm 530 and against the lower surface of chain guide slot portion 540 would flexibly provide the lift necessary to increase chain wrap. However, this would increase the loading at the bushing between the bellcrank support 620 and bellcrank 580, which can only increase the effort to effect a shift from shifter 711. Thus, this is avoided in the preferred embodiment of the present invention.

A simple spool twist shifter 711 (FIG. 18) is used as a handlebar actuator to displace and hold the control cable among the various control cable positions corresponding to the sprocket centers. An input derailleur control cable 604, together with a buffer mechanism 640 that transmits displacement from input derailleur control cable 604 to an output derailleur control cable 600, controls the rear shifting, and a pawl control cable 390 controls shifting of planetary drive system 100.

Figure 18A:
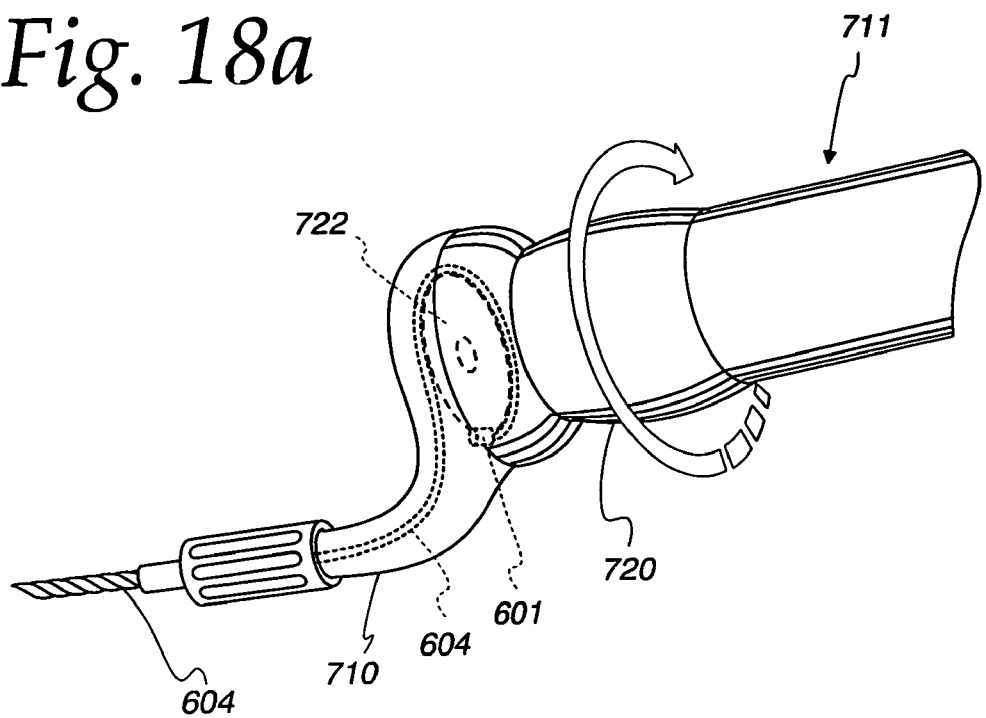
FIG. 18a is a perspective view of twist shifter 711 removed from the bicycle handlebar.
Figure 18B:
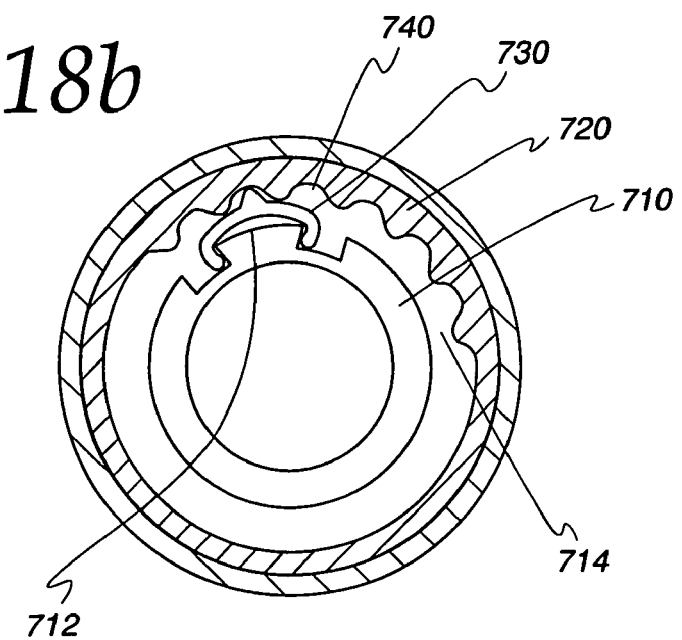
FIG. 18b is a side sectional view of the detent mechanism of twist shifter 711.

FIG. 18 illustrates a seven-position indexing twist shifter 711 for controlling the rear shift cable 600. A similar arrangement with two notches controls pawl control cable 390. Control cable end 601 is socketed into and thereby fixed to twist grip 720. Twist grip 720 is provided with a spool or groove for wrapping the cable 600 as the twist grip 720 is rotated in the cable 600 pulling direction. To flexibly maintain the indexing positions, a detent spring mandrel 710 is surrounded by a detent spring cavity 714. Mandrel 710 and spring cavity are one with the shifter housing and as a unit are clamped to the handlebar using a clamp. This clamp is preferably made of aluminum with a steel bolt (not shown). A plurality of detent notches 740 are integral with the twist grip and spool. A detent spring 730, which may be a metal leaf spring, is shaped to fit into detent spring cavity 714 and interact with detent notches 740. The contact angles between detent spring 730 and detent notches 740 are biased to partially compensate for the fact that it is easier to release control cable 604 than to pull it against bell crank return spring 582. Also, detent spring 730 is shaped to interact with features in spring cavity 714 in a special way, as explained in the following paragraphs.

Conventional indexing shifters for use with a derailleur have employed "overshift" (i.e. pulling the actuator cable past its ultimate destination) at the actuator to cancel out the backlash or lost motion between the actuator (master) and derailleur (slave).

The present invention uses a streamlined, less encumbered derailleur system and does not need "overshift" at the shifter to overcome hysteresis in the linkage. It is also desirable to eliminate the "overshift" and resulting sloppy feel of an actuator or twist grip. This is accomplished in the present invention by use of a special interaction between detent spring 730 and mandrel spring cavity 714. Detent spring 730 is configured to tighten up its contact with spring cavity 714 when the tip of detent spring 730 is extended fully into a particular detent notch 740. Specifically, in this non-shifting phase, detent spring 730 grips a boss 712 between its two gripping ends. Therefore, when twist grip 720 is maintaining the position of chain 152 between shifts, there is no noticeable "slop" in twist grip 720; i.e., twist grip 720 is firmly held in one position by the association of detent spring 730 with detent notch 740 and boss 712, thereby substantially preventing accidental shifts resulting from inadvertent movement of twist grip 720. When twist grip 720 is turned to affect a shift, spring 730 is initially trapped laterally and can only compress radially. Then, the radial compression temporarily creates freedom for sudden lateral movement of detent spring 730 within spring cavity 714 by forcing the gripping ends of detent spring 730 apart, to enable a crisp snap of the tip of detent spring 730 into the next notch 740. When the tip of detent spring 730 is fully extended into the destination notch 740, its gripping ends again grip boss 712, firmly holding twist grip 720 in position. This gives twist shifter 711 a precise firm feel between shifts while preserving the responsive snappy shifting that users prefer.

Figure 25A:
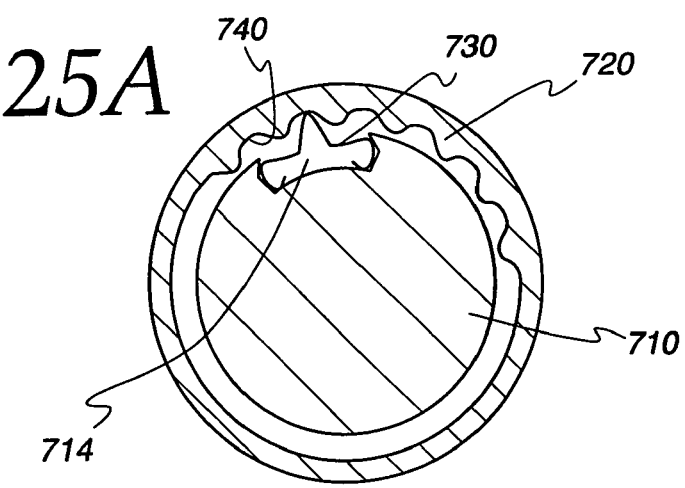
FIG. 25 is a side illustration of three alternative embodiments of a detent spring mechanism in accordance with the present invention.
Figure 25B:
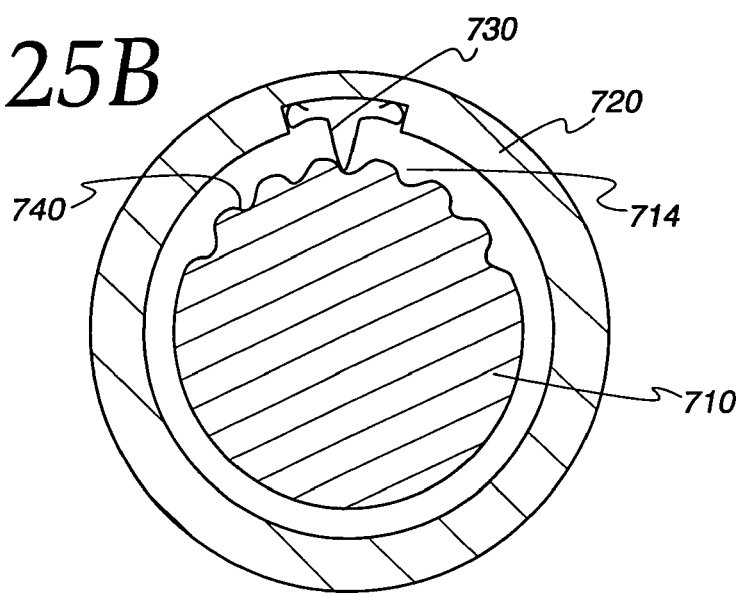
Figure 25C:
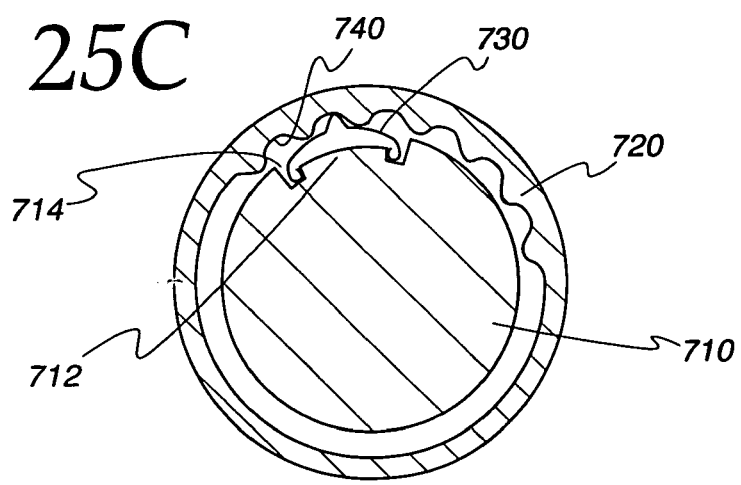

While the illustrated embodiment pertains to a configuration in which notches 740 are integral with twist grip 720, it is equally suitable for notches 740 to be integral with mandrel 710 as shown in fragmentary illustration B of FIG. 25. Also, boss 712 may be omitted as in illustration A. What is important is that detent spring 730 be configured to increase its "play" or "slop" when compressed during a shift, and to minimize the play when residing in a notch 740 or equivalent feature to accurately maintain cable displacement.

Buffer Mechanism

Rear shifting is buffered by a buffer mechanism 640. There are several benefits to this buffer system. The first is that the cable tension is modified so that it is limited by the preload in a buffer spring 660. Also, shift commands from the actuator pulling cable are stored by buffer mechanism 640 so that they can be carried out in step with rear wheel rotation. The drive chain shifts from sprocket to sprocket as programmed by the specialized pickup and release teeth located on sprockets 102 of rear sprocket cluster 104. A minimum amount of rotation of sprocket cluster 104 is required to effect a shift of chain from one sprocket 102 to another. When the bike is being pedaled slowly, or at a standstill, the chain cannot keep up with the commands from the actuator. Rather than jam or cause a spike in control cable tension, the system of the present invention buffers (i.e., saves) the commands and carries them out as soon as sufficient rotation of sprocket cluster 104 makes them possible.

Figure 16:
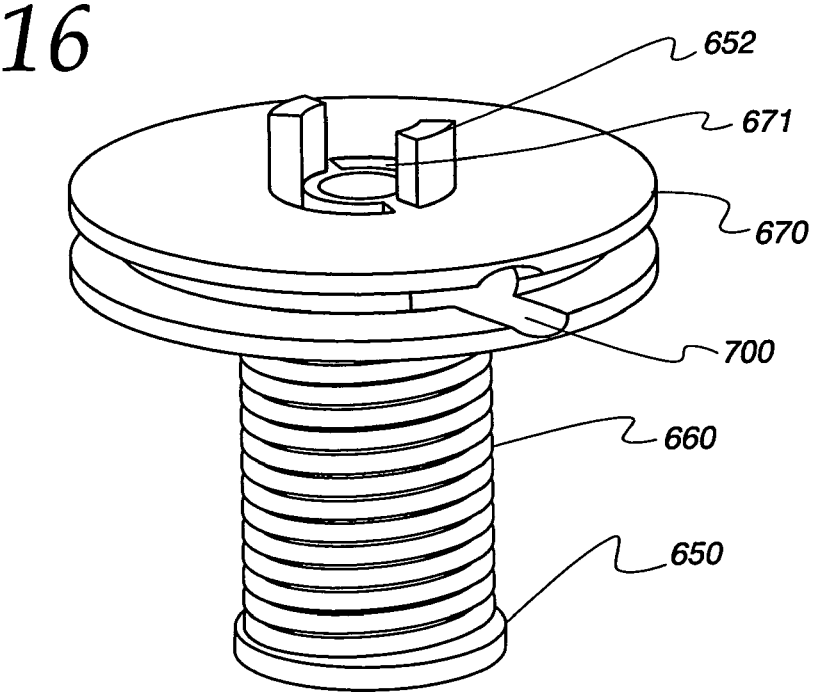
FIG. 16 is a perspective view of buffer mechanism 640 with input spool 680 removed.
Figure 17:
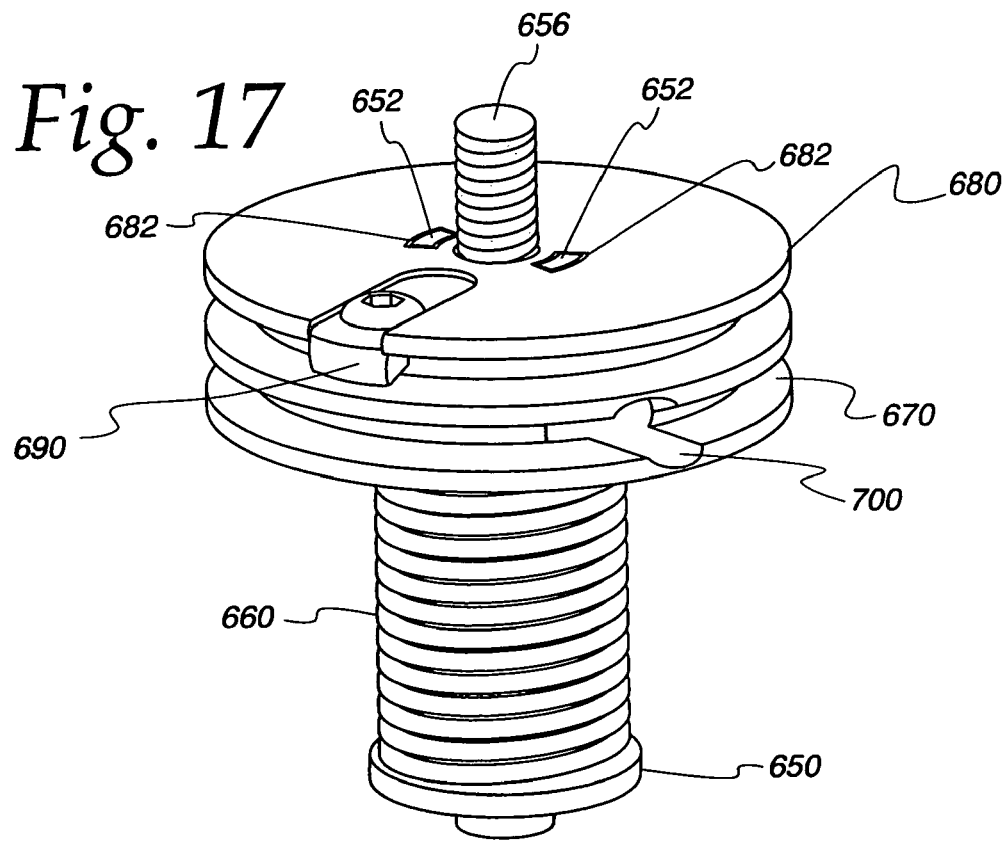
FIG. 17 is a perspective view of buffer mechanism 640 illustrating the relationship of output fork 652 to holes 682 in input spool 680.

Buffer spring 660 is preloaded slightly higher than the highest loading in bellcrank return spring 582. Under normal fast riding conditions, buffer mechanism 640 simply transfers cable displacement. An input spool 680 rotates with an output spool 670. When it is necessary to buffer shift commands, input spool 680 winds up an output fork 652 in the cable pulled direction. Output fork 652 is inserted into holes 682 through input spool 680 so that it is fixed to rotate together with input spool 680, as illustrated in FIG. 17, and is limited in rotation by the fork 652 being trapped in slots 671 in output spool 670, as illustrated in FIG. 16. The preload in buffer spring 660 generally keeps forks 652 to one end of slots 671 so that input spool 680 and output spool 670 rotate en masse.

In particular, buffer spring 660 only permits relative rotation between spools 670 and 680 when the tension in control cable 600 equals or exceeds the preload of buffer spring 660 during an attempted shift, making it necessary to buffer shift commands. In that case, fork 652 will be pulled off the ends of slots 671, thus allowing input spool 680 to rotate farther than output spool 670. As the rotation of sprocket cluster 104 permits, the commands are subsequently carried out per the preload in buffer spring 660 until fork 652 again resides against the ends of slots 671. Buffer mechanism 640 permits enough relative rotation between input spool 680 and output spool 670 so that the entire shift range in the cable pulling direction (corresponding to shifting from the smallest sprocket 102 to the largest) can be buffered and carried out when rotation of sprocket cluster 104 permits. This protects the shifting system from ever becoming jammed or overstressed by, for example, a bike customer twisting twist grip 720 on display bikes at bike shops. The system also insulates shifter 711 from harsh shock waves originating at the derailleur during overly fast shifting. The system also ensures that drive chain 152 will travel smoothly across sprocket cluster 104 through the intended shift gates provided among the sprockets.

Figure 15:
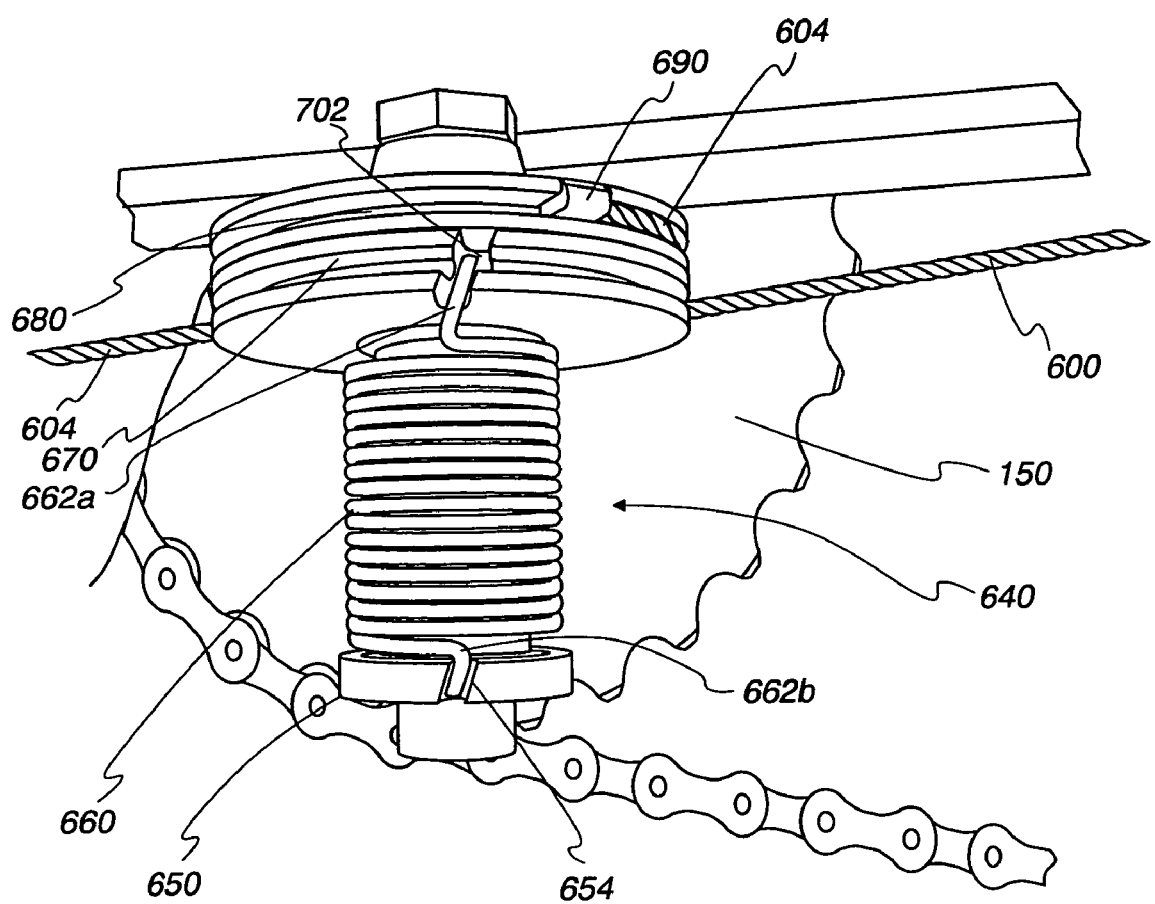
FIG. 15 is a perspective view of buffer mechanism 640 seen from below the non-drive side.

FIG. 15 shows the arrangement of buffer spring 660. A lower tang 662*b* of buffer spring 660 is engaged to a buffer spring mandrel 650. Buffer spring mandrel 650 is integral with fork 652. An upper tang 662a of buffer spring 660 is engaged to output spool 670. This keeps fork 652 forced against the ends of slots 671. Slots 671 are integral with output spool 670.

Input spool 680 is provided with a cable clamp 690 for securing control cable 604 as it pays out of shifter 711. Output spool 670 is provided with a socket 700 for trapping a second length of control cable 604 that pays out to the bellcrank 580 and is ultimately fixed to bellcrank 580 by means of cable clamp 584.

While buffer mechanism 640 of the illustrated embodiment buffers shift commands by storing the relative rotational displacement of input spool 680 and output spool 670 in a preloaded torsional buffer spring 660, it should be noted that shift commands may also be buffered by similarly storing the relative linear displacement of input and output buffer members in a spring preloaded in compression or tension or by any other suitable mechanism for storing relative displacement for subsequent transmission, without departing from the scope or spirit of the present invention.

Enclosure

Figure 23:
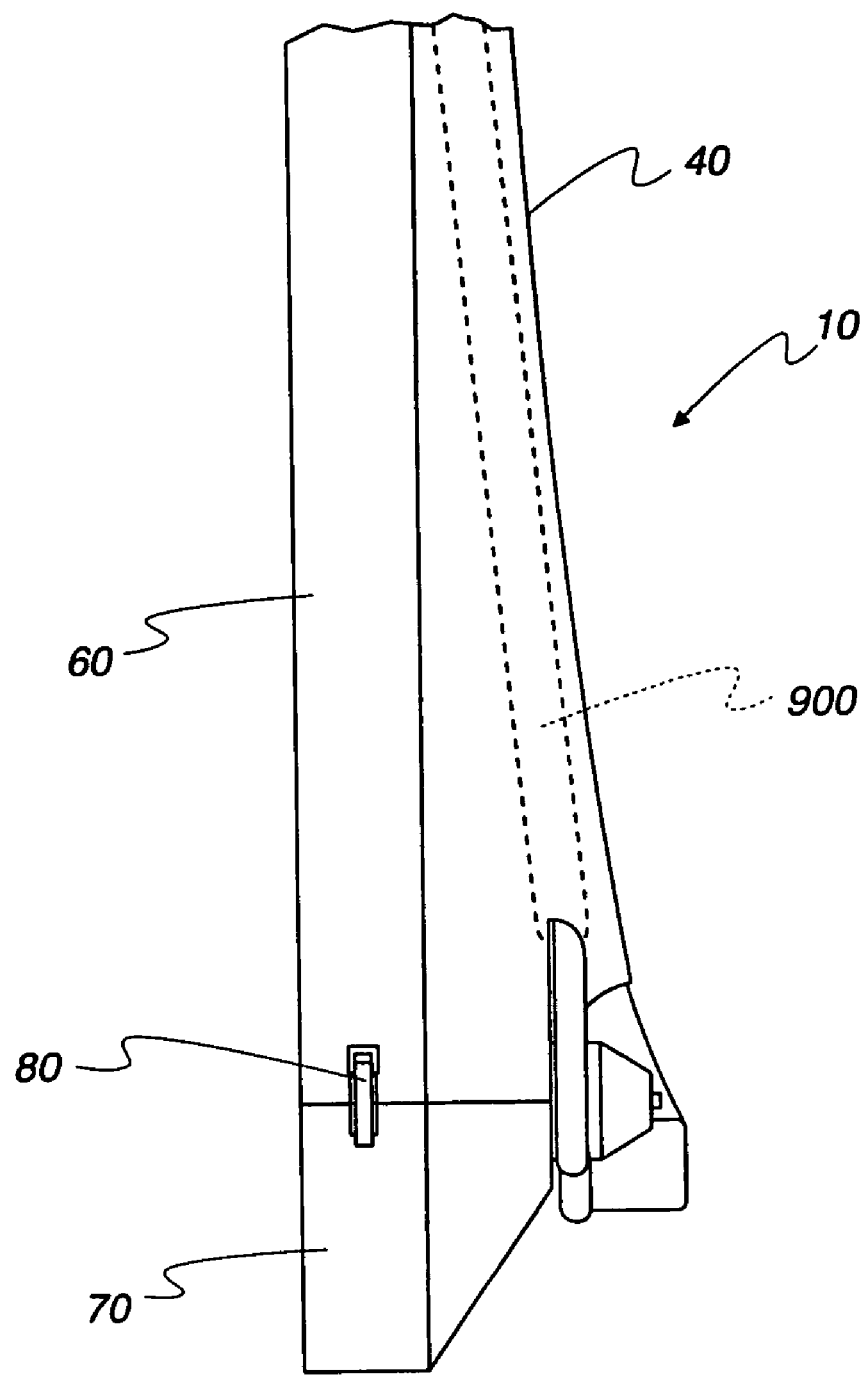
FIG. 23 is a top plan view of the back of enclosed drive train 10, showing how the shadow of the outer edge of top outboard cover plate 40 closely follows the outer edge of chain stay 900, shown in hidden view.

As discussed above, the use of single chain ring 150 permits mounting a chain tensioner 500 proximate to chain ring 150, leaving room for a separate chain guide 510 proximate to sprocket cluster 104. The simplicity of chain guide 510 makes it more compact than the parallelogram of a conventional rear derailleur, thus creating the synergistic result that it is practical to enclose the entire drivetrain 10. In particular, as shown in FIG. 23, it is possible for the outer edge of enclosed drivetrain 10 to closely follow the outer edge of chain stay 900, shown in hidden view, as the components of the streamlined rear derailleur system of the present invention stay substantially inboard of the outer edge of chain stay 900.

Figure 21:
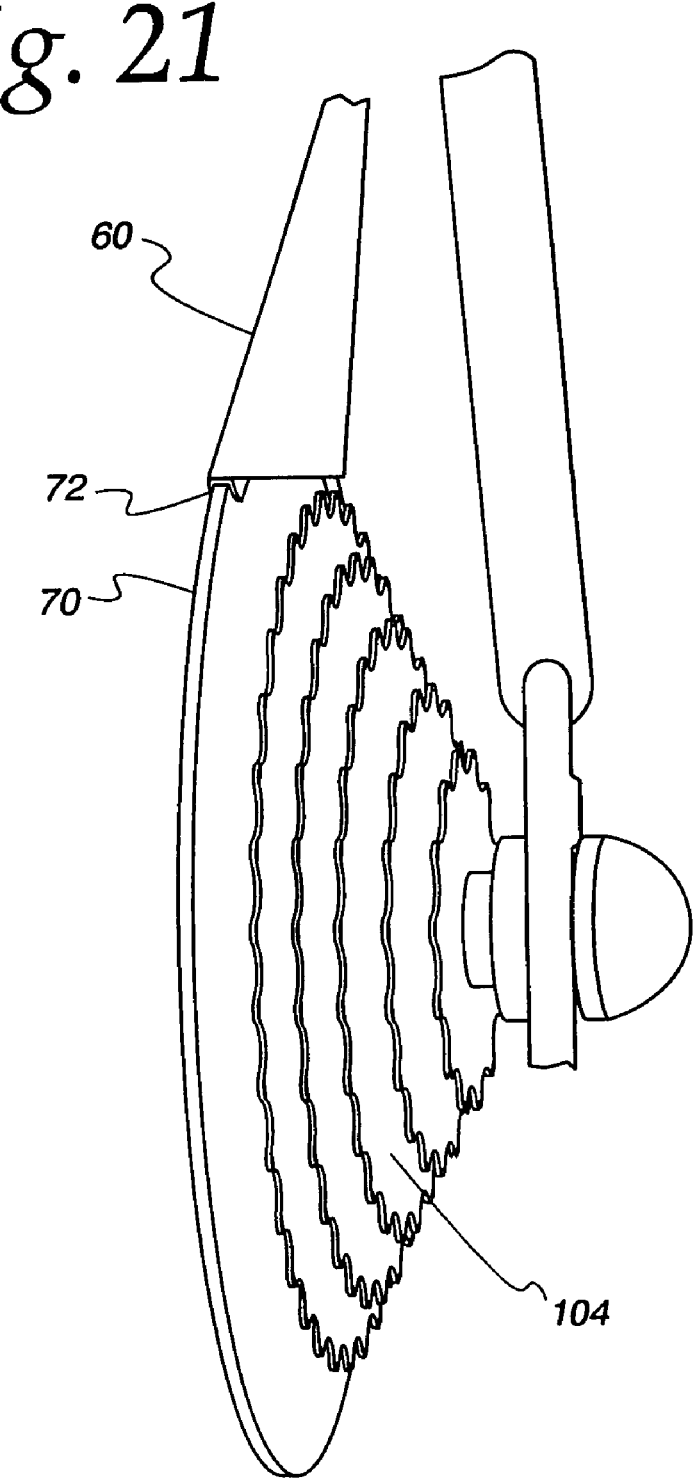
FIG. 21 is a back view of rear back plate 60 and spoke disk 70, illustrating how spoke disk 70 fits in spoke disk receiver groove 72 integral with rear back plate 60.

With reference to FIGS. 19-21, the structure of the enclosure assembly of the present invention is illustrated. A bottom bracket rear plate 62 is provided with a clamping system 63 which fixes rear plate 62 to the outside of the shell of bottom bracket. In addition to enclosing the inboard side of planetary drive system 100, rear plate 62 also provides the structural support for compound pawl 280, buffer mechanism 640 and chain tensioning system 500. Once the bottom bracket rear plate 62 has been clamped to bottom bracket, it is also rotationally trapped to the chain stay by the same structural features supporting the subsystems discussed above. Therefore, rear plate 62 is fixed relative to the bike frame.

A rear back plate 60 is bolted or snapped onto rear plate 62. Rear back plate 60 is provided with a cable path tunnel 66 for routing output control cable 600 from buffer mechanism 640 to bellcrank 580.

Turning to FIG. 20, the front plates of the enclosure assembly are shown. A forward outboard plate 20 is fastened to a flange projecting outboard from rear plate 62. Lower and upper outboard cover plates 30 and 40, respectively, are secured similarly to a flange projecting outboard from rear plate 60. Finally, a sprocket cover plate 50 is clipped to outboard cover plates 30 and 40 for easy removal.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A planetary drive system comprising:
   a) a ring gear rotatably mounted to a frame;
   b) a planet gear enmeshed with the ring gear, the planet gear rotatably mounted to a planet carrier, the planet carrier rotatably mounted to the frame;
   c) a sun gear enmeshed with the planet gear, the sun gear rotatably mounted to the frame;
   d) a ratchet integral with a first planetary member selected from the group consisting of the ring gear, the planet gear, the planet carrier, the sun gear and the frame;
   e) a compound pawl movably disposed between the first planetary member and a second planetary member selected from the group consisting of the ring gear, the planet gear, the planet carrier, the sun gear and the frame, the compound pawl having a base pawl member and a blocker pawl member, the blocker pawl member adapted to engage the ratchet to prevent a driven relative rotation of the first and second planetary members, and the base pawl member movably mounted to the second planetary member at a base joint and the blocker pawl member movably positioned with respect to the base pawl member at an articulation juncture, wherein the compound pawl stably provides blocking forces to oppose a load tending to cause the driven relative rotation when the blocker pawl member engages the ratchet and the relative configuration of the blocker pawl member and base pawl member at the articulation juncture is stable, thereby preventing the driven relative rotation; and
   f) a planetary shift actuator adapted to apply a force to the compound pawl to cause the relative configuration of the blocker pawl member and base pawl member to articulate into an unstable condition at the articulation juncture, thereby substantially releasing the blocking forces and allowing the driven relative rotation.

2. The planetary drive system of claim 1, wherein the planetary shift actuator comprises a planetary shift actuator linkage adapted to transmit the force to the compound pawl.

3. The planetary drive system of claim 2, wherein the planetary shift actuator linkage is a planetary shift actuator cable retained by a cable clamp operatively connected to and pivotally mounted with respect to the blocker pawl member.

4. The planetary drive system of claim 2, wherein the planetary shift actuator linkage is a planetary shift actuator cable retained by a cable clamp operatively connected to and pivotally mounted with respect to the base pawl member.

* * * * *